(12) United States Patent
Lai et al.

(10) Patent No.: US 10,712,864 B2
(45) Date of Patent: Jul. 14, 2020

(54) DUAL-MODE CAPACITIVE TOUCH DISPLAY PANEL

(71) Applicant: AU OPTRONICS CORP., Hsinchu (TW)

(72) Inventors: Shih-Lun Lai, Hsin-Chu (TW); Yi-San Hsieh, Hsin-Chu (TW); I-Hsiung Huang, Hsin-Chu (TW)

(73) Assignee: AU OPTRONICS CORP., Hsinchu (TW)

( * ) Notice: Subject to any disclaimer, the term of this patent is extended or adjusted under 35 U.S.C. 154(b) by 0 days.

(21) Appl. No.: 16/526,590

(22) Filed: Jul. 30, 2019

(65) Prior Publication Data

US 2019/0354228 A1 Nov. 21, 2019

Related U.S. Application Data

(63) Continuation of application No. 15/287,103, filed on Oct. 6, 2016, now Pat. No. 10,416,804.

(30) Foreign Application Priority Data

Apr. 28, 2016 (TW) .............................. 105113286 A

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04105* (2013.01); *G06F 2203/04107* (2013.01); *G06F 2203/04112* (2013.01)

(58) Field of Classification Search
CPC . G06F 2203/04105; G06F 2203/04107; G06F 2203/04112; G06F 3/0412; G06F 3/0416; G06F 3/044
See application file for complete search history.

(56) References Cited

U.S. PATENT DOCUMENTS

| 7,538,760 B2 * | 5/2009 | Hotelling | G06F 3/0414 178/18.06 |
| 7,825,911 B2 * | 11/2010 | Sano | G06F 3/041 178/18.01 |
| 8,179,482 B2 * | 5/2012 | Hur | G06F 3/0412 345/104 |

(Continued)

*Primary Examiner* — Michael J Jansen, II
(74) *Attorney, Agent, or Firm* — WPAT, PC

(57) ABSTRACT

A dual-mode capacitive touch display panel includes first and second substrates, a display layer disposed between the first and second substrates, at least two first touch electrodes, at least two second touch electrodes, plural pressure sensing electrodes, and a shielding conductive layer. The first and second touch electrodes are disposed on the first substrate and overlap sub-pixels thereon. The first and second touch electrodes are respectively separated. The pressure sensing electrodes are disposed on the second substrate, and overlap the corresponding first or second touch electrodes in a vertical projection direction. The shielding conductive layer is disposed on the second substrate and includes plural openings, the pressure sensing electrodes overlap the corresponding openings, and the pressure sensing electrodes have a lower surface resistance than the shielding conductive layer does.

11 Claims, 13 Drawing Sheets

(56) References Cited

U.S. PATENT DOCUMENTS

| | | | | |
|---|---|---|---|---|
| 8,199,116 B2* | 6/2012 | Jeon | G06F 3/0412 | 345/173 |
| 8,411,212 B2* | 4/2013 | Chiba | G02F 1/13338 | 349/12 |
| 8,487,890 B2* | 7/2013 | Juan | G06F 3/045 | 345/156 |
| 8,493,518 B2* | 7/2013 | Moon | G02F 1/13338 | 345/174 |
| 8,692,944 B2* | 4/2014 | Wu | G02F 1/13338 | 345/173 |
| 8,698,769 B2* | 4/2014 | Coulson | G06F 3/044 | 345/173 |
| 8,730,199 B2* | 5/2014 | Sleeman | G01L 1/146 | 345/173 |
| 8,842,228 B2* | 9/2014 | Moon | G02F 1/13338 | 345/174 |
| 8,872,168 B2* | 10/2014 | Choi | H01L 27/3244 | 257/40 |
| 8,878,803 B2* | 11/2014 | Kimura | G02F 1/13338 | 345/173 |
| 8,994,669 B2* | 3/2015 | Chang | G06F 3/047 | 345/173 |
| 9,041,418 B2* | 5/2015 | Hsieh | G06F 3/044 | 178/18.01 |
| 9,395,835 B2* | 7/2016 | No | G02F 1/13338 | |
| 9,436,323 B2* | 9/2016 | Zhao | G02F 1/13338 | |
| 9,454,268 B2* | 9/2016 | Badaye | G06F 3/0416 | |
| 9,470,941 B2* | 10/2016 | Park | G02F 1/13338 | |
| 9,507,456 B2* | 11/2016 | Watazu | G06F 3/0414 | |
| 9,507,463 B2* | 11/2016 | Yang | G06F 3/0412 | |
| 9,542,031 B2* | 1/2017 | Shibata | G06F 3/044 | |
| 9,601,067 B2* | 3/2017 | Huang | G09G 3/3611 | |
| 9,671,898 B2* | 6/2017 | Hsieh | G06F 3/044 | |
| 9,715,294 B2* | 7/2017 | Zhang | G06F 3/0412 | |
| 9,733,756 B2* | 8/2017 | Shepelev | G06F 3/0416 | |
| 9,779,676 B2* | 10/2017 | Al-Dahle | G06F 3/044 | |
| 9,798,416 B2* | 10/2017 | Hsiao | G06F 3/0416 | |
| 9,811,226 B2* | 11/2017 | Itaya | G06F 3/044 | |
| 9,874,970 B2* | 1/2018 | Shih | G06F 3/0412 | |
| 9,965,118 B2* | 5/2018 | Shepelev | G06F 3/044 | |
| 10,019,104 B2* | 7/2018 | Yang | G06F 3/0412 | |
| 10,043,469 B2* | 8/2018 | Al-Dahle | G06F 3/044 | |
| 10,055,067 B2* | 8/2018 | Shinkai | G06F 3/044 | |
| 10,067,590 B2* | 9/2018 | Reynolds | G06F 3/0414 | |
| 10,073,560 B2* | 9/2018 | Reynolds | G06F 3/0414 | |
| 10,152,181 B2* | 12/2018 | Shih | G06F 3/044 | |
| 10,185,427 B2* | 1/2019 | Hsieh | G06F 3/0414 | |
| 10,191,604 B2* | 1/2019 | Lee | G06F 3/044 | |
| 10,303,313 B2* | 5/2019 | Kurasawa | G06F 3/044 | |
| 10,353,507 B2* | 7/2019 | Suzuki | G06F 3/0416 | |
| 10,365,754 B2* | 7/2019 | Chen | G06F 3/0416 | |
| 10,372,258 B2* | 8/2019 | Pan | G06F 3/0416 | |
| 10,416,804 B2* | 9/2019 | Lai | G06F 3/0412 | |
| 10,459,555 B2* | 10/2019 | Yang | H01L 27/323 | |
| 10,459,563 B2* | 10/2019 | Qu | G02F 1/13338 | |
| 10,540,037 B2* | 1/2020 | Cheng | G06F 3/0414 | |
| 2007/0070047 A1* | 3/2007 | Jeon | G02F 1/13338 | 345/173 |
| 2007/0229464 A1* | 10/2007 | Hotelling | G06F 3/0414 | 345/173 |
| 2008/0100587 A1* | 5/2008 | Sano | G06F 3/041 | 345/173 |
| 2008/0129898 A1* | 6/2008 | Moon | G02F 1/13338 | 349/12 |
| 2009/0073138 A1* | 3/2009 | Lee | G06F 3/0412 | 345/173 |
| 2009/0237369 A1* | 9/2009 | Hur | G06F 3/0412 | 345/173 |
| 2010/0066686 A1* | 3/2010 | Joguet | G06F 3/0412 | 345/173 |
| 2010/0149128 A1* | 6/2010 | No | G02F 1/13338 | 345/174 |
| 2010/0207902 A1* | 8/2010 | Juan | G06F 3/0412 | 345/173 |
| 2011/0057899 A1* | 3/2011 | Sleeman | G01L 1/146 | 345/174 |
| 2011/0102359 A1* | 5/2011 | Chiba | G02F 1/13338 | 345/173 |
| 2011/0115733 A1* | 5/2011 | Shih | G06F 3/0412 | 345/173 |
| 2011/0187669 A1* | 8/2011 | Abiru | G02F 1/13338 | 345/173 |
| 2011/0242027 A1* | 10/2011 | Chang | G06F 3/0412 | 345/173 |
| 2012/0086666 A1* | 4/2012 | Badaye | G06F 3/044 | 345/174 |
| 2012/0133612 A1* | 5/2012 | Wang | G06F 3/0412 | 345/174 |
| 2012/0162109 A1* | 6/2012 | Sasaki | G06F 3/0412 | 345/173 |
| 2013/0021285 A1* | 1/2013 | Kimura | G02F 1/13338 | 345/173 |
| 2013/0033450 A1* | 2/2013 | Coulson | G06F 3/044 | 345/174 |
| 2013/0044074 A1* | 2/2013 | Park | G02F 1/13338 | 345/174 |
| 2013/0050126 A1* | 2/2013 | Kimura | G02F 1/13338 | 345/173 |
| 2013/0057513 A1* | 3/2013 | Wu | G02F 1/13338 | 345/174 |
| 2013/0099802 A1* | 4/2013 | Hsieh | G06F 3/044 | 324/661 |
| 2013/0265256 A1* | 10/2013 | Nathan | G06F 3/0414 | 345/173 |
| 2013/0285952 A1* | 10/2013 | Huang | G09G 3/3611 | 345/173 |
| 2013/0286301 A1* | 10/2013 | Moon | G02F 1/13338 | 349/12 |
| 2014/0042398 A1* | 2/2014 | Choi | H01L 27/3244 | 257/40 |
| 2014/0111471 A1* | 4/2014 | Zhao | G02F 1/13338 | 345/174 |
| 2014/0132560 A1* | 5/2014 | Huang | G06F 3/044 | 345/174 |
| 2014/0218334 A1* | 8/2014 | Shibata | G06F 3/044 | 345/174 |
| 2015/0205440 A1* | 7/2015 | Yang | G06F 3/0412 | 345/174 |
| 2015/0227256 A1* | 8/2015 | Hsieh | G06F 3/044 | 345/174 |
| 2015/0261367 A1* | 9/2015 | Zhang | G06F 3/0412 | 345/173 |
| 2015/0355771 A1* | 12/2015 | Watazu | G06F 3/0414 | 345/174 |
| 2016/0011691 A1* | 1/2016 | Shinkai | G06F 3/044 | 345/174 |
| 2016/0026297 A1* | 1/2016 | Shinkai | G06F 3/044 | 345/174 |
| 2016/0077648 A1* | 3/2016 | Hsieh | G06F 3/0414 | 345/174 |
| 2016/0092015 A1* | 3/2016 | Al-Dahle | G06F 3/044 | 345/174 |
| 2016/0202800 A1* | 7/2016 | Itaya | G06F 3/044 | 345/174 |
| 2016/0266682 A1* | 9/2016 | Fu | G06F 3/044 | |
| 2016/0334903 A1* | 11/2016 | Shepelev | G06F 3/044 | |
| 2016/0334917 A1* | 11/2016 | Shepelev | G06F 3/0416 | |
| 2016/0357309 A1* | 12/2016 | Qu | G06F 3/044 | |
| 2016/0364072 A1* | 12/2016 | Chiang | G06F 3/0416 | |
| 2017/0024075 A1* | 1/2017 | Chiang | G06F 3/0412 | |
| 2017/0068368 A1* | 3/2017 | Hsiao | G06F 3/0416 | |
| 2017/0075493 A1* | 3/2017 | Lee | G06F 3/0418 | |
| 2017/0115768 A1* | 4/2017 | Shih | G06F 3/044 | |
| 2017/0115799 A1* | 4/2017 | Shih | G06F 3/0412 | |
| 2017/0115812 A1* | 4/2017 | Lin | G06F 3/0416 | |
| 2017/0115813 A1* | 4/2017 | Chen | G06F 3/0416 | |
| 2017/0192582 A1* | 7/2017 | Pan | G06F 3/0416 | |
| 2017/0269763 A1* | 9/2017 | Yang | G06F 3/0412 | |

(56) References Cited

U.S. PATENT DOCUMENTS

| | | | |
|---|---|---|---|
| 2017/0277300 A1* | 9/2017 | Kurasawa | G06F 3/044 |
| 2017/0293379 A1* | 10/2017 | Lee | G06F 3/044 |
| 2017/0315650 A1* | 11/2017 | Reynolds | G06F 3/0414 |
| 2017/0315657 A1* | 11/2017 | Lai | G06F 3/0412 |
| 2017/0315662 A1* | 11/2017 | Reynolds | G06F 3/0414 |
| 2018/0018052 A1* | 1/2018 | Yang | G06F 3/0412 |
| 2018/0025694 A1* | 1/2018 | Al-Dahle | G06F 3/044 |
| | | | 345/174 |
| 2018/0039367 A1* | 2/2018 | Suzuki | G06F 3/0414 |
| 2018/0232096 A1* | 8/2018 | Cheng | G06F 3/0416 |

* cited by examiner

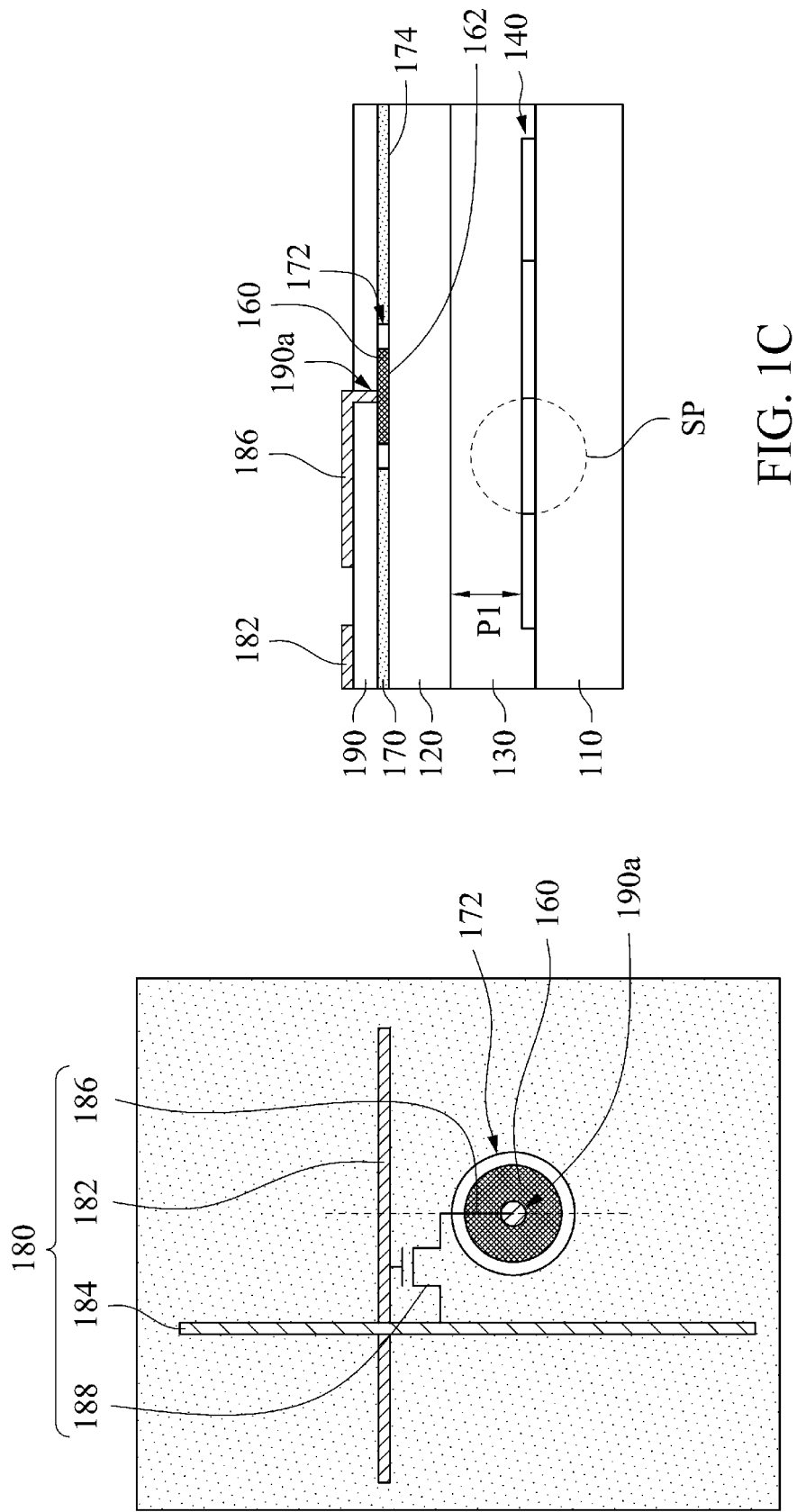

DUAL-MODE CAPACITIVE TOUCH DISPLAY PANEL

FIELD OF THE DISCLOSURE

The present disclosure relates generally to a dual-mode capacitive touch display panel.

RELATED ART

Touch display devices, such as smart phones, computers, and the like, are common human machine interface devices. When a user views words or graphs in a screen and taps on a corresponding position, a touch signal is detected and sent to a controller for processing so that a signal at the corresponding position is generated. Common sensing methods include resistive sensing, capacitive sensing, infrared sensing, ultrasonic sensing, and the like.

However, in recent years, the best way to equip a touch display device with various functions is what everyone strives for but also presents challenges that are difficult to overcome.

SUMMARY

In one aspect of the present disclosure, a dual-mode capacitive touch display panel is provided. In certain embodiments, the dual-mode capacitive touch display panel may operate in an outer-force-detection mode (or namely force detection mode) and a touch-position-detection mode (or namely position detection mode). In the dual-mode capacitive touch display panel, a sensing electrode is configured to detect a touch position, and the sensing electrode is integrated with a pressure sensing electrode to detect force. In addition, a shielding conductive layer may shield an electrical field in the outer-force-detection mode and allow the electrical field to pass through it in the the touch-position-detection mode, thereby achieving a dual-mode capacitive touch effect. Moreover, the dual-mode capacitive touch display panel also has a display mode for displaying a frame.

In certain embodiments of the present disclosure, the dual-mode capacitive touch display panel comprises a first substrate, a second substrate, a display medium layer, at least two first touch electrodes, at least two second touch electrodes, a plurality of pressure sensing electrodes, and a shielding conductive layer. The first substrate comprises a plurality of sub-pixels, wherein at least some of the sub-pixels have at least one switching element, a signal line, and a pixel electrode, the switching element being electrically connected to the signal line and the pixel electrode. The second substrate is disposed separately from the first substrate. The display medium layer is sandwiched between the first substrate and the second substrate. The first touch electrodes are disposed on the first substrate and each of the first touch electrodes is separated from each other. The second touch electrodes are disposed on the first substrate and each of the second touch electrodes is separated from each other; the second touch electrodes are separated from the first touch electrodes; and the first touch electrodes and the second touch electrodes partially overlap with the sub-pixels located on the first substrate respectively. The pressure sensing electrodes are disposed on the second substrate, wherein each of the pressure sensing electrodes at least partially overlaps with a corresponding first touch electrode or a corresponding second touch electrode in a vertical projection direction. The shielding conductive layer is disposed on the second substrate, wherein the shielding conductive layer comprises a plurality of openings, and each of the pressure sensing electrodes at least partially overlaps with a corresponding opening of the shielding conductive layer; and a surface resistance of each of the pressure sensing electrodes is less than that of the shielding conductive layer.

In an embodiment of the present disclosure, each of the first touch electrodes and the second touch electrodes comprises a plurality of sub-electrodes connected to each other, and each of the sub-electrodes can be used as a common electrode for each of the sub-pixels.

In an embodiment of the present disclosure, the shielding conductive layer is disposed on an outer surface of the second substrate, and the pressure sensing electrode is disposed on the outer surface of the second substrate, and located on top of the shielding conductive layer.

In an embodiment of the present disclosure, the dual-mode capacitive touch display panel comprises a control circuit and an insulating layer. The control circuit is located on the second substrate and is electrically connected to each of the pressure sensing electrodes. The insulating layer is sandwiched between the control circuit and the shielding conductive layer, wherein the insulating layer covers the openings of the shielding conductive layer, the shielding conductive layer and the pressure sensing electrodes; the insulating layer has a plurality of openings, and each of the pressure sensing electrodes is connected to the control circuit located on the second substrate via a corresponding opening of the insulating layer.

In an embodiment of the present disclosure, the dual-mode capacitive touch display panel comprises a control circuit and an insulating layer. The control circuit is located on the second substrate and is electrically connected to each of the pressure sensing electrodes. The insulating layer is sandwiched between the control circuit and the shielding conductive layer, wherein the insulating layer covers the openings of the shielding conductive layer and the shielding conductive layer, and the pressure sensing electrodes are located on the insulating layer.

In an embodiment of the present disclosure, the dual-mode capacitive touch display panel comprises a control circuit, a first insulating layer, and a second insulating layer. The control circuit is located on the second substrate and is electrically connected to each of the pressure sensing electrodes. The first insulating layer is sandwiched between the control circuit and the shielding conductive layer, wherein the first insulating layer covers the openings of the shielding conductive layer and at least a portion of the shielding conductive layer. The second insulating layer is disposed on the outer surface of the second substrate, wherein the second insulating layer covers the control circuit and the first insulating layer; the second insulating layer has a plurality of openings, and the pressure sensing electrodes are located on the openings of the second insulating layer, such that each of the pressure sensing electrodes is connected to the control circuit located on the second substrate via a corresponding opening of the second insulating layer.

In an embodiment of the present disclosure, the shielding conductive layer is disposed on an inner surface of the second substrate, and the pressure sensing electrode is disposed on the outer surface of the second substrate, located on top of the shielding conductive layer, wherein the inner surface of the second substrate faces the first substrate.

In an embodiment of the present disclosure, the dual-mode capacitive touch display panel comprises a control circuit, disposed on the outer surface of the second substrate and is electrically connected to each of the pressure sensing electrodes.

In an embodiment of the present disclosure, each of the pressure sensing electrodes overlap with a corresponding first touch electrode or second touch electrode in the vertical projection direction; and each of the pressure sensing electrodes is located in a region of the corresponding first touch electrode or second touch electrode in a vertical projection direction.

In an embodiment of the present disclosure, a gap exists between one of the first touch electrodes and one of the second touch electrodes, wherein each of the first touch electrodes and the gap at least partially overlap with one of the pressure sensing electrodes in the vertical projection direction, or each of the second touch electrodes and the gap at least partially overlap with another one of the pressure sensing electrodes in the vertical projection direction.

In an embodiment of the present disclosure, a gap exists between one of the first touch electrodes and one of the second touch electrodes, and another gap exists between the at least two first touch electrodes and between the at least two second touch electrodes, wherein both the first touch electrodes, the second touch electrodes, the gap, and the another gap at least partially overlap with one of the pressure sensing electrodes in the vertical projection direction.

In an embodiment of the present disclosure, each of the pressure sensing electrodes is located in the corresponding opening of the shielding conductive layer.

In an embodiment of the present disclosure, when a vertical projection area of one of the openings of the shielding conductive layer is divided by a vertical projection area of the corresponding first touch electrode or second touch electrode, the result is greater than 0 and less than or equal to 5%.

In an embodiment of the present disclosure, the dual-mode capacitive touch display panel further comprises a plurality of lines, disposed on the first substrate, wherein each of the lines is electrically connected to the corresponding first touch electrode or the corresponding second touch electrode.

In an embodiment of the present disclosure, the dual-mode capacitive touch display panel further comprises at least one first bridge electrode and at least one second bridge electrode, wherein the first bridge electrode is electrically connected between one of the first touch electrodes and one of the second touch electrodes; the second bridge electrode is electrically connected between another of the first touch electrodes and another of the second touch electrodes, and the first bridge electrode is interlaced with the second bridge electrode.

In an embodiment of the present disclosure, a spacing between each of the pressure sensing electrodes and a corresponding first touch electrode or a corresponding second touch electrode is deformable when a force is applied to each of the pressure sensing electrodes.

In an embodiment of the present disclosure, the dual-mode capacitive touch display panel further comprises at least one controller, operatively coupled to the first touch electrodes and the second touch electrodes, wherein the controller is configured to measure a position of an object relative to the first touch electrodes and the second touch electrodes, and measure a force applied to the second substrate.

In an embodiment of the present disclosure, in a position detection mode, both the pressure sensing electrodes and the shielding conductive layer are at a floating potential, and a touch position is calculated through capacitance change amounts of the first touch electrode and of the second touch electrode, or a capacitance change amount between each of the first touch electrodes and each of the second touch electrodes; and in a force detection mode, both the pressure sensing electrodes and the shielding conductive layer are at a fixed potential, and a force applied to each of the pressure sensing electrodes is calculated through a capacitance change amount between each of the pressure sensing electrodes and a corresponding first touch electrode or second touch electrode.

In an embodiment of the present disclosure, in a display mode, the pressure sensing electrodes of both the shielding conductive layer and the first touch electrodes or the second touch electrodes are at a fixed potential to display an image.

BRIEF DESCRIPTION OF THE DRAWINGS

FIG. 1B is a partial top view of the dual-mode capacitive touch display panel in FIG. 1A.

FIG. 1C is a cross-sectional view alone the line 1C-1C in FIG. 1B.

DETAILED DESCRIPTION OF THE DISCLOSURE

Figure 1A:
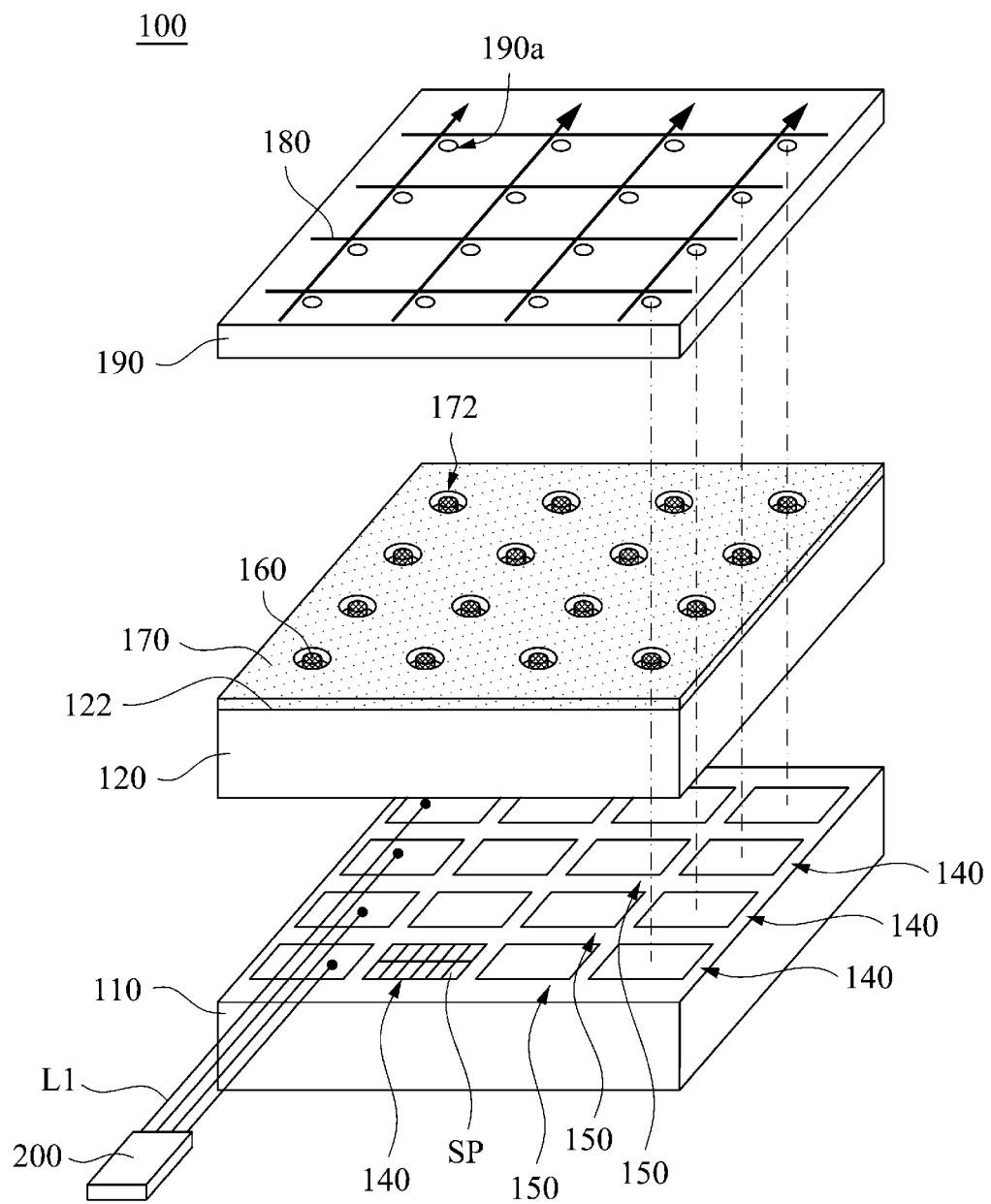
FIG. 1A is an exploded view of a dual-mode capacitive touch display panel according to an embodiment of the present disclosure.

The drawings will be used to disclose a plurality of embodiments of the present disclosure. For the sake of clear illustration, many practical details will be explained together in the description below. However, it is appreciated that the practical details should not be used to limit the present disclosure. In other words, in some embodiments of the present disclosure, the practical details are not essential. Moreover, for the sake of drawing simplification, some conventionally customary structures and elements in the drawings will be schematically shown in a simplified way.

FIG. 1A is an exploded view of a dual-mode capacitive touch display panel 100 according to an embodiment of the present disclosure. The dual-mode capacitive touch display panel 100 comprises a first substrate 110, a second substrate 120, a display medium layer (or a display layer, not depicted), at least two first touch electrodes 140, at least two second touch electrodes 150, a plurality of pressure sensing electrodes 160, and a shielding conductive layer 170. The first substrate 110 and the second substrate 120 comprise a plurality of sub-pixels SP. In an embodiment of the present disclosure, the first substrate 110 comprising a plurality of sub-pixels SP is used as an example, but the present disclosure is not limited thereto.

In some embodiments, the first substrate 110 may be, for example, a thin film transistor substrate. The second substrate 120 may be, for example, a color filter layer substrate or a general substrate. The second substrate 120 is disposed separately from the first substrate 110. A material of one of the first substrate 110 and the second substrate 120 may comprise glass, quartz, a polymer material (for example, Polyimide (PI), benzocyclobutene (BCB), polycarbonate (PC), or another suitable material), or another suitable material, or a combination of at least two of the above materials. In another embodiment, at least one of a color filter layer, a transparent electrode layer, a flat layer, or another function layer may be selectively disposed on the first substrate 110 or the second substrate 120, or disposed on the first substrate 110 and the second substrate 120 respectively. The display medium layer (not marked in figure) is sandwiched between the first substrate 110 and the second substrate 120 and has a material comprising a self-luminescent material (for example, an organic luminescent material, an inorganic luminescent material, another suitable material, or a combination thereof) or a non-self-luminescent material (for example, a liquid crystal material, an electrophoresis material, an electro-wetting material, another suitable material, or a combination thereof). In the present embodiment, a liquid crystal layer is used as an example for the display medium layer (not depicted), but the present disclosure is not limited thereto. In many embodiments of the present disclosure, a display image can be presented through the plurality of sub-pixels of the dual-mode capacitive touch display panel 100.

In the embodiment of the present disclosure, the first touch electrodes 140 and the second touch electrodes 150 located on the first substrate 110 are used as an example. For example, the first touch electrodes 140 are disposed on the first substrate 110 and are separated from each other; the second touch electrodes 150 are disposed on the first substrate 110 and each of the second touch electrodes is separated from each other. The second touch electrodes 150 and the first touch electrodes 140 are separated from each other. Thus, each of the first touch electrodes 140 and each of the second touch electrodes 150 may partially overlap with the sub-pixels SP located on the first substrate 110 respectively; such as each of the first touch electrodes 140 and each of the second touch electrodes 150 may partially overlap with the sub-pixels SP located on the first substrate 110 in a vertical projection direction (vertically projected onto the first substrate 110). Here, only sub-pixels SP overlapping with the first touch electrodes 140 or the second touch electrodes 150 are depicted. However, in actual practice, many sub-pixels SP do not overlap with the first touch electrodes 140 or the second touch electrodes 150, and the present disclosure is not limited to the number of sub-pixels SP depicted in the figure. Moreover, through the above disposal, the dual-mode capacitive touch display panel 100 can detect a touch position. Specifically, the dual-mode capacitive touch display panel 100 can calculate a touch position through capacitance change amounts of the first touch electrode 140 and the second touch electrode 150, or a capacitance change amount between each of the first touch electrodes 140 and each of the second touch electrodes 150.

In some of the embodiments, the pressure sensing electrodes 160 are disposed on an outer surface 122 of the second substrate 120. Each of the pressure sensing electrodes 160 at least partially overlaps with a corresponding first touch electrode 140 or the second touch electrode 150 in the vertical projection direction. Here, the so-called vertical projection direction is a direction vertical to the first substrate 110. The shielding conductive layer 170 is disposed on the outer surface 122 of the second substrate 120. The shielding conductive layer 170 is separated from the pressure sensing electrodes 160, such as the shielding conductive layer 170 is not connected to (or namely contacted with) each of the pressure sensing electrodes 160. The shielding conductive layer 170 comprises a plurality of openings 172. Each of the pressure sensing electrodes 160 at least partially overlaps with a corresponding opening 172; that is, each of the pressure sensing electrodes 160 at least partially overlaps with a corresponding opening 172 in the vertical projection direction (vertically projected onto the second substrate 120). Further, the pressure sensing electrode 160 may be disposed in the opening 172. In order to implement the dual-mode operation of the present disclosure, a surface resistance of each of the pressure sensing electrodes 160 is less than that of the shielding conductive layer 170, thereby reducing noise or interference between the foregoing two electrodes, or operation misjudgment of the foregoing two electrodes. Materials of the pressure sensing electrode 160 and the shielding conductive layer 170 may be selectively different or substantially the same.

Through the above disposing, the dual-mode capacitive touch display panel 100 can detect an external force (or namely force). Specifically, the dual-mode capacitive touch display panel 100 can calculate a force applied to each of the pressure sensing electrodes 160 through a capacitance change amount between each of the pressure sensing electrodes 160 and a corresponding first touch electrode 140 or a corresponding second touch electrode 150.

Accordingly, the dual-mode capacitive touch display panel 100 can achieve the functions of displaying a image, detecting a touch position, and detecting a force.

Configurations of elements in the dual-mode capacitive touch display panel 100 are described below in detail.

Refer to FIG. 1A to FIG. 1C. FIG. 1B is a partial top view of the dual-mode capacitive touch display panel 100 in FIG. 1A. FIG. 1C is a cross-sectional view along the line 1C-1C in FIG. 1B. In the present embodiment, the dual-mode capacitive touch display panel 100 further comprises a control circuit 180 and an insulating layer 190. The control circuit 180 and the insulating layer 190 are located on the outer surface of the second substrate 120. The control circuit 180 is electrically connected to each of the pressure sensing electrodes 160. The insulating layer 190 is sandwiched between the control circuit 180 and the shielding conductive layer 170 to prevent them from being connected to each other; such that the control circuit 180 is separated from the shielding conductive layer 170. The control circuit 180 can be connected to other signal sources to control each of the pressure sensing electrodes 160 independently or to control all the pressure sensing electrodes 160.

For example, the control circuit 180 may comprise a signal line 182, a data line 184, a wire 186, and a switch element 188. The signal line 182 and the data line 184 are separated from each other with an insulating layer (not shown). The switch element 188 may be in the form of various semiconductor elements, such as a transistor, a diode, or another suitable element. A material of the semiconductor element comprises polycrystalline silicon, monocrystalline silicon, microcrystalline silicon, amorphous silicon, an organic semiconductor material, a metal oxide semiconductor material, or another suitable material, or a combination of at least two of the above materials. A control end of the switch element 188 may be connected to the signal line 182; two ends of the switch element 188 are connected to the data line 184 and the wire 186 respectively. In this way, the signal line 182 can control whether the two ends of the switch element 188 are turned on, and thereby control whether the data line 184 and the wire 186 are turned on. In another embodiment, the wire 186 may be a part of one of the two ends of the switch element 188 and extend to be connected to the pressure sensing electrode 160.

In many embodiments of the present disclosure, the insulating layer 190 may extend to cover the openings 172 and the pressure sensing electrodes 160. The insulating layer 190 has a plurality of openings 190*a*, wherein each of the openings 190*a* at least partially overlaps with a corresponding pressure sensing electrode 160 in the vertical projection direction (for example, vertically projected onto the second substrate 120); such as each of the openings 190*a* exposes at least a part of the corresponding pressure sensing electrode 160. In another embodiment, each of the openings 190*a* overlaps with a corresponding pressure sensing electrodes 160 in the vertical projection direction (for example, vertically projected onto the second substrate 120); such as at least a part of each of the pressure sensing electrodes 160 is located at a corresponding opening 190*a*. Each of the openings 190*a*, therefore, exposes the corresponding pressure sensing electrode 160, and the wire 186 does not contact the shielding conductive layer 170. At least a part of the wire 186 may be disposed in the opening 190*a*, such that each of the pressure sensing electrodes 160 is connected to the control circuit 180 located on the second substrate 120 via the corresponding opening 190*a*. Thus, the control circuit 180 can selectively turn on the switch element 188 through the signal line 182 and thereby selectively control turning on or off each of the pressure sensing electrodes 160.

In many embodiments of the present disclosure, a material of the signal line 182, the data line 184, or the wire 186 of the control circuit 180 may be any kind of material with good electrical conductivity, such as a metal, an alloy, a conductive adhesive, or another suitable material, or a combination of at least two of the above materials. The insulating layer 190 may be of a single-layer or a multi-layer structure. Its material may be an inorganic material (for example, silicon oxide, silicon nitride, silicon oxynitride, or another suitable material) an organic material (for example, a photoresist, polyimide (PI), benzocyclobutene (BCB), or another suitable material), or another suitable material. Specifically, a surface resistance (or referred to as a sheet resistance) of the signal line 182, the data line 184, or the wire 186 of the control circuit 180, i.e., the surface resistance without taking into account a resistance in a thickness direction of the conductive material, is less than the surface resistance of the shielding conductive layer 170. In some embodiments, the surface resistance of the signal line 182, the data line 184, or the wire 186 of the control circuit 180 may be substantially the same as or different from the surface resistance of the pressure sensing electrode 160. Moreover, the material of the signal line 182, the data line 184, or the wire 186 of the control circuit 180 may be substantially the same as or different from the material of the pressure sensing electrode 160.

That the control circuit 180 is able to selectively control a potential of each of the pressure sensing electrodes 160 independently should not be used to limit the scope of the present disclosure. In some embodiments, the control circuit 180 may be only latticed wires (or namely mesh wires) formed by a plurality of wires; such as wires in different directions (for example, an X direction and a Y direction) are connected to each other, and the switch element 188 is not present, so as to control potentials of all the pressure sensing electrodes 160. Alternatively, the control circuit 180 can be configured to partially control potentials of some of the pressure sensing electrodes 160, i.e., to control potentials of the pressure sensing electrodes 160 in a plurality of regions. Moreover, if the control circuit 180 is provided with the switch element 188, the pressure sensing electrode 160 and the opening 172 may selectively not to overlap with an interlace position of the signal line 182 and the data line 184. However, the present disclosure is not limited thereto. In some embodiments, whether the switch element 188 is present or not, the pressure sensing electrode 160 and the opening 172 can overlap with the interlace position of the signal line 182 and the data line 184 (in a vertical direction, vertical to the second substrate).

Through the above configuration, a vertical electrical field passing through each of the openings 172 may be generated between a pressure sensing electrode 160 and a corresponding first touch electrode 140 or a corresponding second touch electrode 150. In the present embodiment, a spacing P1 exists between each of the pressure sensing electrodes 160 and a corresponding first touch electrode 140 or a corresponding second touch electrode 150. The spacing P1 is deformable when a force, derived from touching, is applied to each of the pressure sensing electrodes 160. In this way, an electrical field change and/or a capacitance change amount between each of the first touch electrodes 140 or the second touch electrodes 150 and a corresponding pressure sensing electrode 160 can be detected, and a change of the spacing P1 can be calculated, thereby obtaining an external force applied by a user.

In some embodiments, each of the pressure sensing electrodes 160 is located in a region in the vertical projection direction (vertically projected onto the first substrate 110) of a corresponding first touch electrode 140 or a corresponding second touch electrode 150. In other words, each of the pressure sensing electrodes 160 fully overlaps with (completely overlaps with) a corresponding first touch electrode 140 or each of the pressure sensing electrodes 160 fully overlaps with (completely overlaps with) a corresponding second touch electrode 150. In this way, the size of an overlapping area of each of the pressure sensing electrodes 160 and a corresponding first touch electrode 140 or the size of an overlapping area of each of the pressure sensing electrodes 160 and a corresponding second touch electrode 150 can be increased, thus improving the sensitivity and fineness of an external force detection.

In the present embodiment, the area of each of the pressure sensing electrodes 160 is less than the area of a corresponding opening 172, such that each of the pressure sensing electrodes 160 may be located in the corresponding opening 172 and is not connected to or is not contacted with the shielding conductive layer 170; such as the pressure sensing electrodes 160 are separated from the shielding conductive layer 170. Therefore, a bottom surface 162 of the pressure sensing electrode 160 may be flush with a bottom surface 174 of the shielding conductive layer 170, thereby reducing the thickness of the dual-mode capacitive touch display panel 100 and avoiding disposing of an additional insulating layer.

In many embodiments of the present disclosure, a material of the pressure sensing electrode 160 may be any kind of material with good electrical conductivity, such as a metal, an alloy, a conductive adhesive, indium tin oxide, indium gallium zinc oxide, indium zinc oxide, carbon nanotube/rod or another suitable material, or a combination of at least two of the above materials. For example, the surface resistance of the pressure sensing electrode 160 is about 0 to $10^4$ Ohms per square unit area ($\Omega$/square or $\Omega/\square$). The shielding conductive layer 170 may be made of various transparent or translucent conductive materials, such as indium zinc oxide, indium tin oxide, indium gallium zinc oxide, a carbon nanotube/rod, metal or an alloy having a thickness less than 60 angstroms, or another suitable material, or a combination of at least two of the above materials. Specifically, the surface resistance of the pressure sensing electrode 170 is about $10^8$ to $10^{12}$ Ohms per square unit area ($\Omega$/square or $\Omega/\square$). In many embodiments of the present disclosure, the electrical conductivity of the pressure sensing electrode 160 is superior to the electrical conductivity of the shielding conductive layer 170. Thus, the shielding conductive layer 170 can shield an electrical field in an appropriate operation mode.

Figure 2B:
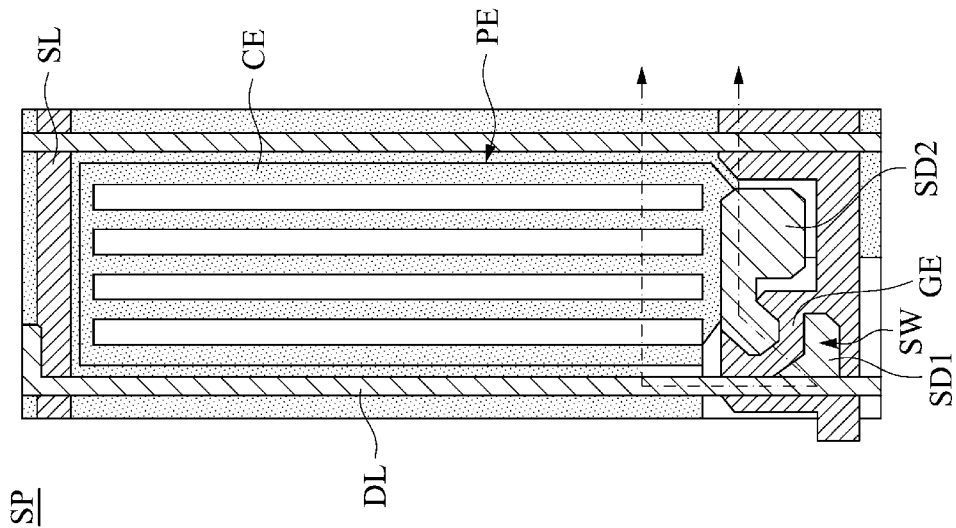
FIG. 2B is a top view of the sub-pixels in FIG. 2A.
Figure 2A:
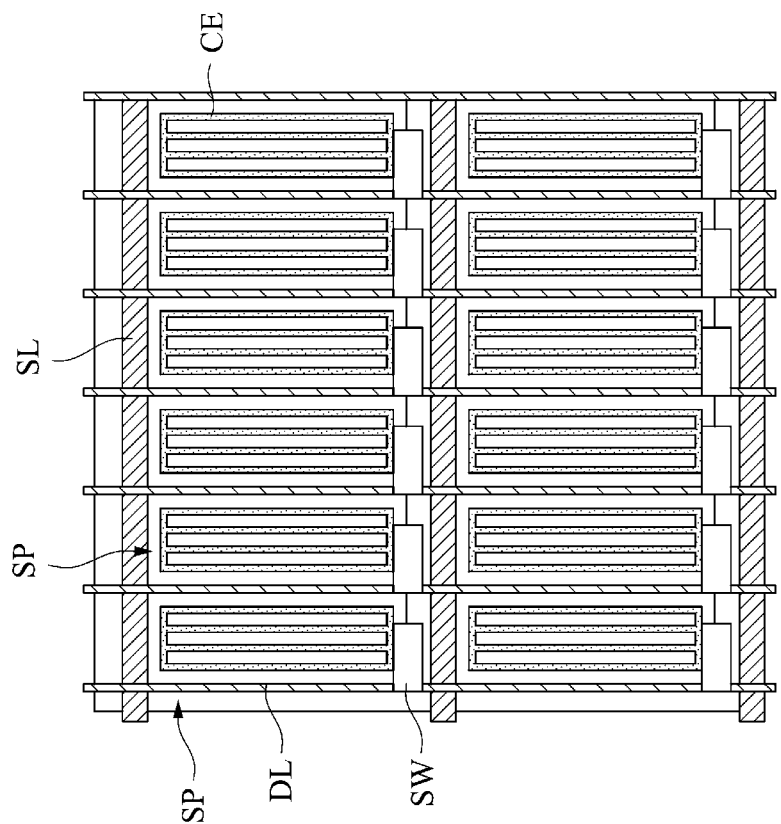
FIG. 2A is a schematic top view of a plurality of sub-pixels in FIG. 1A.
Figure 2C:
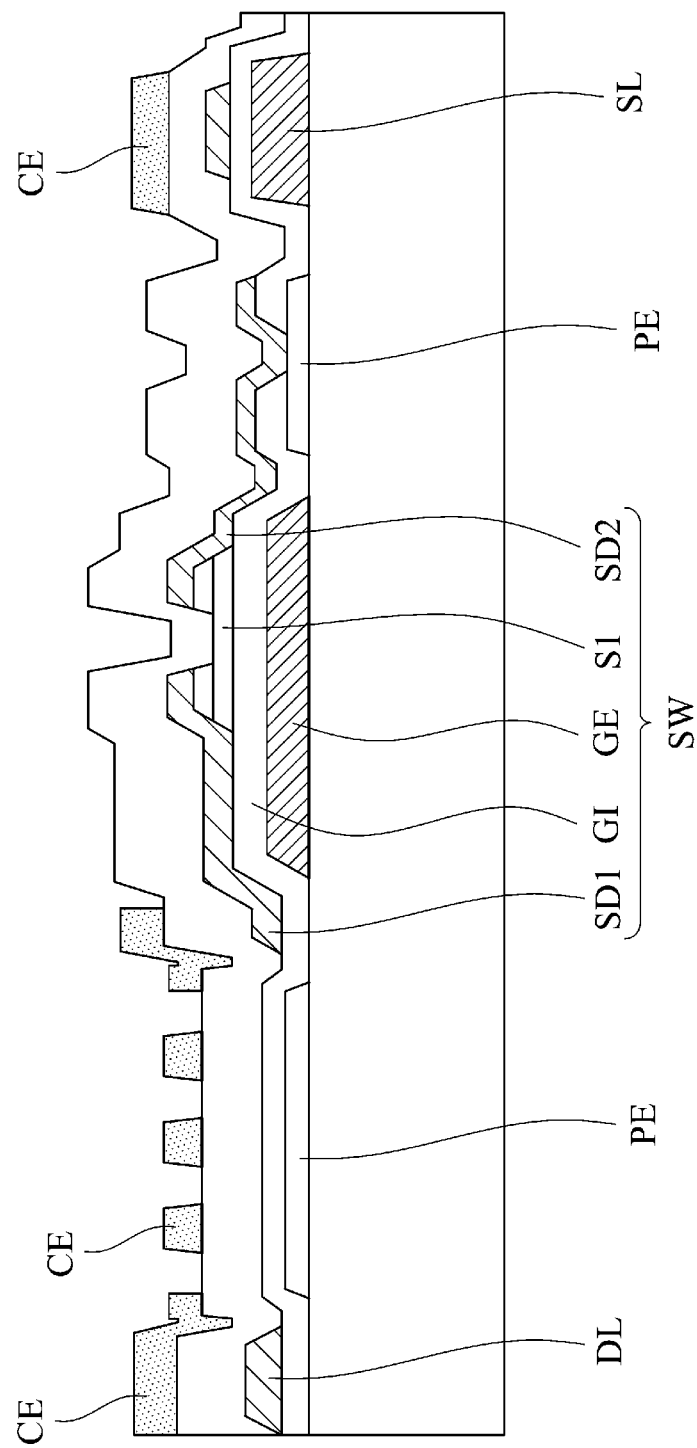
FIG. 2C is a cross-sectional view of the sub-pixels SP in FIG. 2B.

In one or more embodiments of the present disclosure, the first touch electrode 140 or the second touch electrode 150 may be formed by the internal elements of the sub-pixels SP. For example, refer to FIG. 2A to FIG. 2C. FIG. 2A is a schematic top view of a plurality of sub-pixels SP in FIG. 1A. FIG. 2B is a top view of a single sub-pixel SP in FIG. 2A. FIG. 2C is a cross-sectional view of the single sub-pixel SP in FIG. 2B. At least some of the sub-pixels SP may have at least one switching element SW, a signal line SL, a data line DL, a common electrode CE, and a pixel electrode PE. The switching element SW may be in the form of various thin film transistors. In another embodiment, at least some of the sub-pixels SP may have at least one switching element SW, a signal line SL, a data line DL, a pixel electrode PE, and another element required in coordination with various display types. For example, in a self-luminescent display panel, another element may be a voltage source, a driving element, or another element. Alternatively, for example, in another non-self-luminescent display panel, another element may be a common electrode line located in the sub-pixel.

In some embodiments, the switching element SW may comprise a gate GE, a source/drain SD1, a source/drain SD2, a gate insulator layer GI, and a semiconductor layer S1. The gate insulator layer GI is disposed between the gate GE and the semiconductor layer S1. The gate GE is electrically connected to the signal line SL. The source/drain SD1 and the source/drain SD2 are connected to two ends of the semiconductor layer S1 respectively, wherein the source/drain SD1 is electrically connected to the data line DL, and the source/drain SD2 is electrically connected to the pixel electrode PE. A material of the semiconductor layer S1 may be selected from the materials of the foregoing semiconductor element, wherein the material of the semiconductor layer S1 may be substantially the same as or different from the material of the foregoing semiconductor element. A material of the gate insulator layer GI may be selected from the materials of the foregoing insulating layer 190, wherein the material of the gate insulator layer GI may be substantially the same as or different from the material of the foregoing insulating layer 190. In this way, the switching element SW is connected to the signal line SL, the data line DL, and the pixel electrode PE; the switching element SW is turned on through controlling the signal line SL and the data line DL so that a signal (for example, a voltage) required by the pixel electrode PE may be transmitted. The common electrode CE may be grounded, floated, or connected to an appropriate voltage source to be provided with an appropriate potential, so a horizontal electrical field is formed between the common electrode CE and the pixel electrode PE to operate the display medium layer (for example, the liquid crystal layer, not depicted) to rotate/deflect, thus achieving the effect of displaying a frame. In an example of the present embodiment, the common electrode CE is located above the pixel electrode PE, but the present disclosure is not limited thereto. In another embodiment, the common electrode CE is located below the pixel electrode PE. Moreover, in another embodiment, the common electrode CE in the sub-pixel may be disposed on an inner surface of the second substrate 120; the pixel electrode PE may be disposed on an inner surface of the first substrate 110. A vertical electrical field is therefore formed between the common electrode CE and the pixel electrode PE to operate the display medium layer (for example, the liquid crystal layer, not depicted) to rotate/deflect, thus achieving the effect of displaying a frame. In another embodiment, the common electrode CE in the sub-pixel may be disposed on the inner surfaces of the second substrate 120 and the first substrate 110; the pixel electrode PE may be disposed on the inner surface of the first substrate 110. A composite electrical field, vertical to the horizontal electrical field, is therefore formed between the common electrode CE and the pixel electrode PE to operate the display medium layer (for example, the liquid crystal layer, not depicted) to rotate/deflect, thus achieving the effect of displaying a frame. In another embodiment, the display medium layer (for example, a self-luminescent layer) is sandwiched between the common electrode CE and the pixel electrode PE and is controlled to emit light or not to emit light, thus achieving the effect of displaying a frame.

In one or more embodiments of the present disclosure, each of the first touch electrode 140 and the second touch electrode 150 comprises a plurality of sub-electrodes (not marked) connected to each other, and each of the sub-electrodes (not marked) can be used as the common electrode CE of each of the sub-pixels SP. In this case, in the two modes of detecting an external force and detecting a touch position, the common electrode CE of the sub-pixel SP can transmit appropriate potentials respectively, to assist in calculating the capacitance change amount.

It should be understood that the structure of the sub-pixel SP on the first substrate 110 (see FIG. 1A) provided herein is only taken as an example and it should not limit the scope of the present disclosure. The sub-pixel SP may be any structure with an internal element appropriately used as a touch electrode. In another embodiment, the first substrate 110 (see FIG. 1A) may be disposed through another configuration. Each of the sub-electrodes may be the data line DL, the signal line SL, or the pixel electrode of the sub-pixel SP. In this case, the sub-electrodes may be the data lines DL or the signal lines SL of the sub-pixels SP, located in the sub-pixel, and are not connected to one another.

Returning to FIG. 1A, the dual-mode capacitive touch display panel 100 may further comprise a plurality of lines L1 and at least one controller 200 disposed on the first substrate 110. The lines L1 is respectively connected to a corresponding first touch electrode 140 or a corresponding second touch electrode 150 through, for example, nodes (that is, solid dots, not marked) in FIG. 1A. The controllers 200 are operatively coupled to the first touch electrodes 140 and the second touch electrodes 150 through the lines L1, such that each of the first touch electrodes 140 and each of the second touch electrodes 150 can be configured to detect a touch position independently. The controller 200 is configured to measure a position of an object relative to the first touch electrode 140 and the second touch electrode 150, and can measure a force applied to the second substrate 120. Further, the dual-mode capacitive touch display panel 100 obtains a touch position through a capacitance change of the first touch electrode 140 and the second touch electrode 150 (for example, in a self-capacitance manner). In another embodiment, the dual-mode capacitive touch display panel 100 obtains a touch position through a capacitance change between the first touch electrode 140 and the second touch electrode 150 (for example, in a mutual capacitance manner).

In many embodiments of the present disclosure, the dual-mode capacitive touch display panel 100 can operate sequentially (successively) or non-sequentially (non-successively) in the following three modes: a display mode, a force detection mode, and a position detection mode. It should be understood that, the display mode, the force detection mode, and the position detection mode are not necessarily operated sequentially. Preferably, the same display frame may comprise the foregoing three modes, but the present disclosure is not limited thereto. In another embodiment, the same display frame may comprise at least one of the foregoing three modes through an appropriately-designed control circuit and calculation manner. The mode in this embodiment may also be applicable to the following embodiment.

For example, when the dual-mode capacitive touch display panel 100 is in the display mode, the pressure sensing electrodes 160, the shielding conductive layer 170, and the first touch electrodes 140 or second touch electrodes 150 are all substantially at a fixed potential, such as a ground potential or another potential. The pixel electrode may be connected to an appropriate operating potential to display a frame (image). In this case, the shielding conductive layer 170 may shield an electrical field (for example, an electrical field outside the display panel).

When the dual-mode capacitive touch display panel 100 is in the outer-force-detection mode (or namely force detection mode), the pressure sensing electrodes 160 and the shielding conductive layer 170 are all substantially at a fixed potential; for example, a ground potential or an operating potential of the display medium layer 130 (see FIG. 1C) is at a fixed potential. In this case, the shielding conductive layer 170 may shield an electrical field (for example, an electrical field outside the display panel).

In this way, the pressure sensing electrode 160 is at a substantially uniform potential because of its good electrical conductivity. A capacitance change between each of the pressure sensing electrodes 160 and a corresponding first touch electrode 140 or a corresponding second touch electrode 150 may be inferred by detecting the potential of the first touch electrode 140 or the second touch electrode 150, thereby calculating a force applied to each of the pressure sensing electrodes 160.

When the dual-mode capacitive touch display panel 100 is in the position-detection mode, the pressure sensing electrodes 160 and the shielding conductive layer 170 are all at a floating potential; and an electrical field can still pass through the shielding conductive layer 170 having a higher surface resistance. Here, in an example of self-capacitance sensing manner, the capacitance change amount of the first touch electrode 140 and/or the second touch electrode 150 can be calculated by detecting the potential of the first touch electrode 140 or the potential of the second touch electrode 150, or the potentials of the first touch electrode 140 and the second touch electrode 150. Such a design makes it possible to calculate a touch position.

In some embodiments, a shielding effect may be generated when the pressure sensing electrode 160 with a low surface resistance is substantially at a floating potential; if the opening 172 of the shielding conductive layer 170 or the area of the pressure sensing electrode 160 is too large in design, the touch sensitivity may be affected when the dual-mode capacitive touch display panel is in the position-detection mode. In one or more embodiments of the present disclosure, a vertical projection area (an area vertically projected onto the first substrate) of one of the openings 172 of the shielding conductive layer 170 is divided by a vertical projection area (an area vertically projected onto the first substrate) of a corresponding one of the first touch electrodes 140 or a vertical projection area (an area vertically projected onto the first substrate) of one of the openings 172 of the shielding conductive layer 170 is divided by a vertical projection area (an area vertically projected onto the first substrate) of a corresponding one of the second touch electrodes 150, the result is greater than 0 and less than or about equal to 5%. Further, a vertical projection area (an area vertically projected onto the first substrate) of one of the pressure sensing electrodes 160 is divided by a vertical projection area (an area vertically projected onto the first substrate) of a corresponding one of the first touch electrodes 140 or a vertical projection area (an area vertically projected onto the first substrate) of one of the pressure sensing electrodes 160 is divided by a vertical projection area (an area vertically projected onto the first substrate) of a corresponding one of the second touch electrodes 150, the result is greater than 0 and less than or about equal to 5%.

In the above operation manner, the pressure sensing electrode 160 and the shielding conductive layer 170 may substantially have the same potential. For example, if the pressure sensing electrode 160 and the shielding conductive layer 170 are connected to substantially the same potential or are both at a floating potential, but the scope of the present disclosure should not be limited thereto. In some embodiments, the pressure sensing electrode 160 and the shielding conductive layer 170 may have different potentials. Moreover, each of the pressure sensing electrodes 160 may have different potentials through the control circuit 180.

Figure 3:
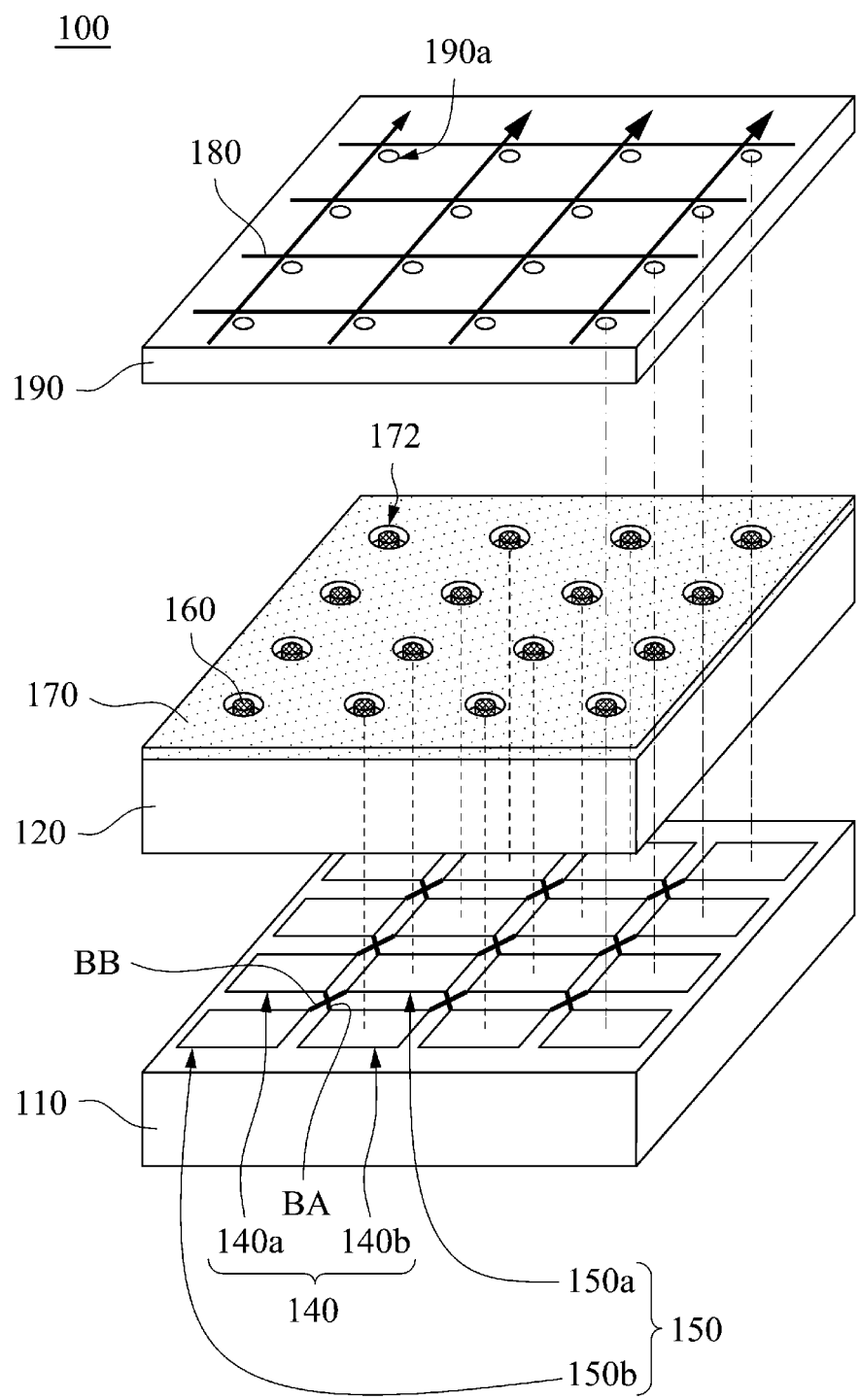
FIG. 3 is an exploded view of a dual-mode capacitive touch display panel 100 according to another embodiment of the present disclosure.

FIG. 3 is an exploded view of a dual-mode capacitive touch display panel 100 according to another embodiment of the present disclosure. Implementation of the present embodiment is similar to that of the embodiment in FIG. 1A, wherein the difference is that in the present embodiment, a touch position is detected through a mutual capacitance between the first touch electrode 140 and the second touch electrode 150.

Here, the first touch electrode 140 is divided into a first touch electrode 140a and a first touch electrode 140b; the second touch electrode 150 is divided into a second touch electrode 150a and a second touch electrode 150b. The dual-mode capacitive touch display panel 100 may further comprise at least one first bridge electrode BA and at least one second bridge electrode BB, wherein the first bridge electrode BA is connected between the first touch electrodes 140a and 140b, and the second bridge electrode BB is connected between the second touch electrodes 150a and 150b; the first bridge electrode BA is interlaced with the second bridge electrode BB.

In this way, a signal of one of the first touch electrode 140a and the second touch electrode 150a can be provided, and a capacitance change between the first touch electrode 140 and the second touch electrode 150 can be detected, thereby calculating a touch position.

Here, the dual-mode capacitive touch display panel 100 may further comprise an insulating block (not depicted), disposed between the first bridge electrode BA and the second bridge electrode BB, such that the first bridge electrode BA is isolated from the second bridge electrode BB. The first bridge electrode BA and the second bridge electrode BB may be made of various conductive materials, and selected from the materials of the foregoing pressure sensing electrode 160. The materials of the first bridge electrode BA and the second bridge electrode BB may be substantially the same as or different from the material of the pressure sensing electrode 160. The insulating block may be formed of various insulating materials, and selected from the materials of the foregoing insulating layer 190, wherein the material of the insulating block may be substantially the same as or different from the material of the insulating layer 190.

Other details of the present embodiment are generally as described above and are not repeatedly described herein.

Figure 4A:
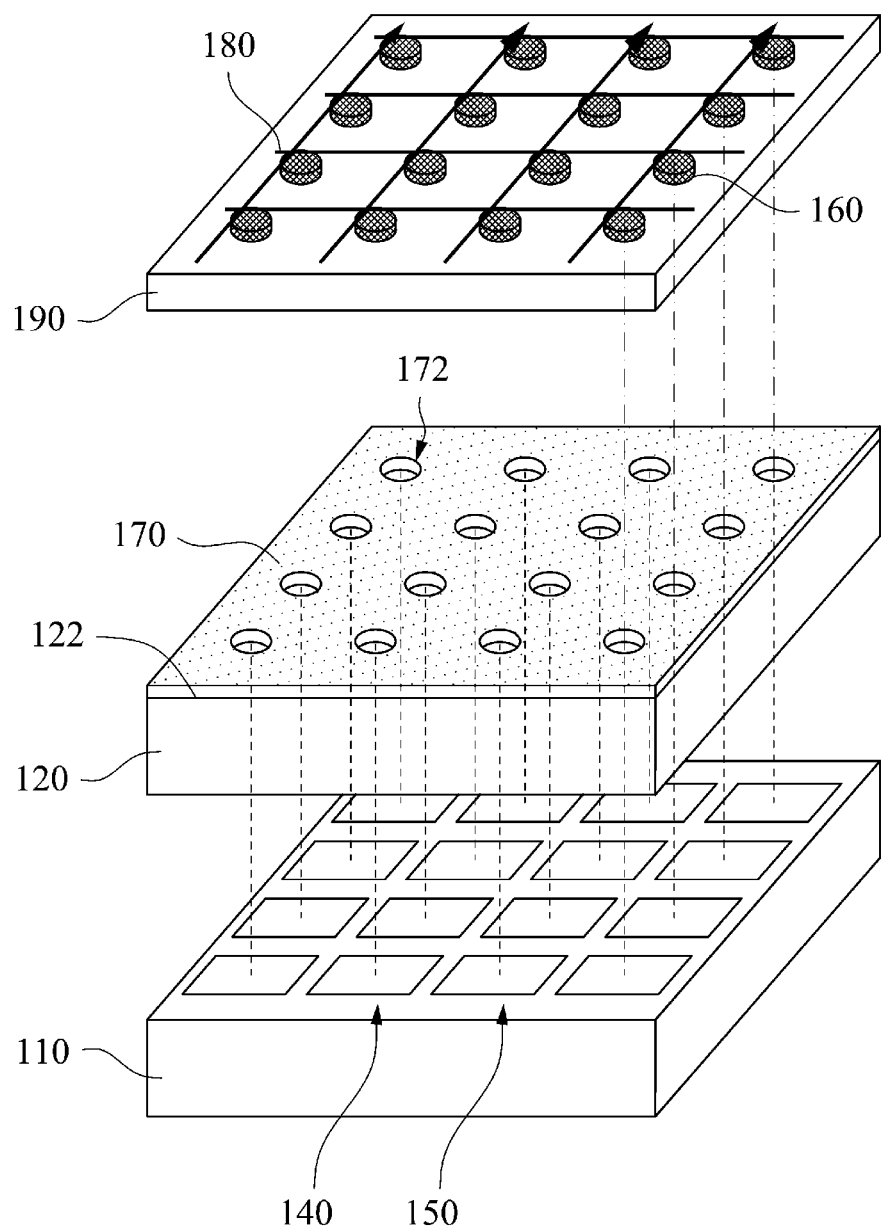
FIG. 4A is an exploded view of a dual-mode capacitive touch display panel according to another further embodiment of the present disclosure.
Figure 4B:
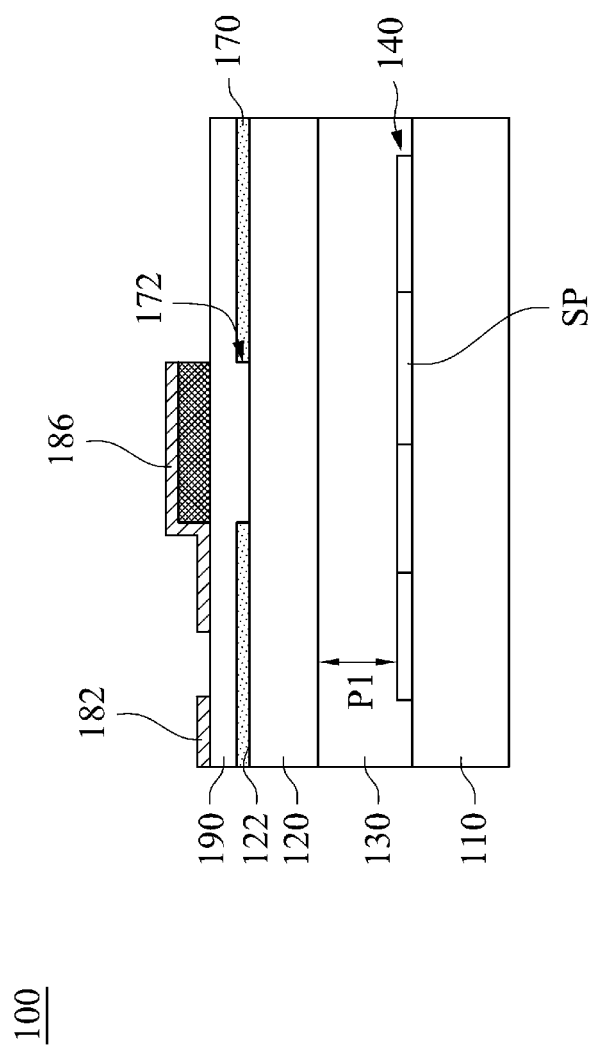
FIG. 4B is a partial cross-sectional view of the dual-mode capacitive touch display panel in FIG. 4A.

FIG. 4A is an exploded view of a dual-mode capacitive touch display panel 100 according to yet another embodiment of the present disclosure. FIG. 4B is a partial cross-sectional view of the dual-mode capacitive touch display panel 100 in FIG. 4A. Implementation of the present embodiment is similar to that of the embodiment in FIG. 1A, wherein the difference is that in the present embodiment, the insulating layer 190 extends to cover the opening 172, and the pressure sensing electrode 160 is located on top of the insulating layer 190. In other words, the pressure sensing electrode 160 at least partially overlaps with the opening 172 in a direction vertically projected on the second substrate 120; such as the opening 172 will be filled in the insulating layer 190. In addition, the touch electrode may also be used, such as the touch electrodes shown in FIG. 1 or FIG. 3.

In the present embodiment, the shielding conductive layer 170 is disposed on the outer surface 122 of the second substrate 120; the pressure sensing electrode 160 is disposed on the outer surface 122 of the second substrate 120, and is located on the shielding conductive layer 170; that is, the pressure sensing electrode 160 is located on the insulating layer 190 on the shielding conductive layer 170. The control circuit 180 (for example, the design shown in FIG. 1B) can be directly disposed on the insulating layer 190 and is connected to the pressure sensing electrode 160; so it is not necessary to dispose the foregoing opening in the insulating layer 190 so that the control circuit 180 is connected to the pressure sensing electrode 160 via the opening, thereby simplifying the manufacturing process. In another embodiment, the control circuit 180 may be only latticed wires (or namely mesh wire) consisting of a plurality of wires; such as wires in different directions (for example, an X direction and a Y direction) are connected to each other, and the switch element 188 is not present.

Each of the openings 172 of the shielding conductive layer 170 at least partially overlaps with a corresponding first touch electrode 140 or each of the openings 172 of the shielding conductive layer 170 at least partially overlaps with a corresponding second touch electrode 150. Thus, a vertical electrical field passing through each of the openings 172 may be generated between a pressure sensing electrode 160 and a corresponding first touch electrode 140 or between a pressure sensing electrode 160 and a corresponding second touch electrode 150. A change of the spacing P1 is calculated by detecting a capacitance change amount and/or an electrical field change between each of the first touch electrodes 140 and a corresponding pressure sensing electrode 160 or between the second touch electrodes 150 and a corresponding pressure sensing electrode 160, thus obtaining an external force applied by a user.

In the present embodiment, the vertical projection area (an area vertically projected onto the second substrate 120) of one of the pressure sensing electrodes 160 is roughly equal to the vertical projection area (an area vertically projected onto the second substrate 120) of one of the openings 172 of the shielding conductive layer 170, but the scope of the present disclosure should not be limited thereto. In some embodiments, although not depicted herein, because each of the pressure sensing electrodes 160 is not disposed in each of the openings 172 of the shielding conductive layer 170, the vertical projection area (the area vertically projected onto the second substrate 120) of one of the pressure sensing electrodes 160 may be greater than the vertical projection area (the area vertically projected onto the second substrate 120) of one of the openings 172 of the shielding conductive layer 170. Alternatively, in some embodiments, the vertical projection area (the area vertically projected onto the second substrate 120) of one of the pressure sensing electrodes 160 may be less than the vertical projection area (the area vertically projected onto the second substrate 120) of one of the openings 172 of the shielding conductive layer 170; yet the pressure sensing electrode 160 still at least partially overlaps with a corresponding first touch electrodes 140 or a corresponding second touch electrode 150 in the vertical projection direction (vertically projected onto the first substrate 110).

Other details of the present embodiment are generally as described above and are not repeatedly described herein.

Figure 5A:
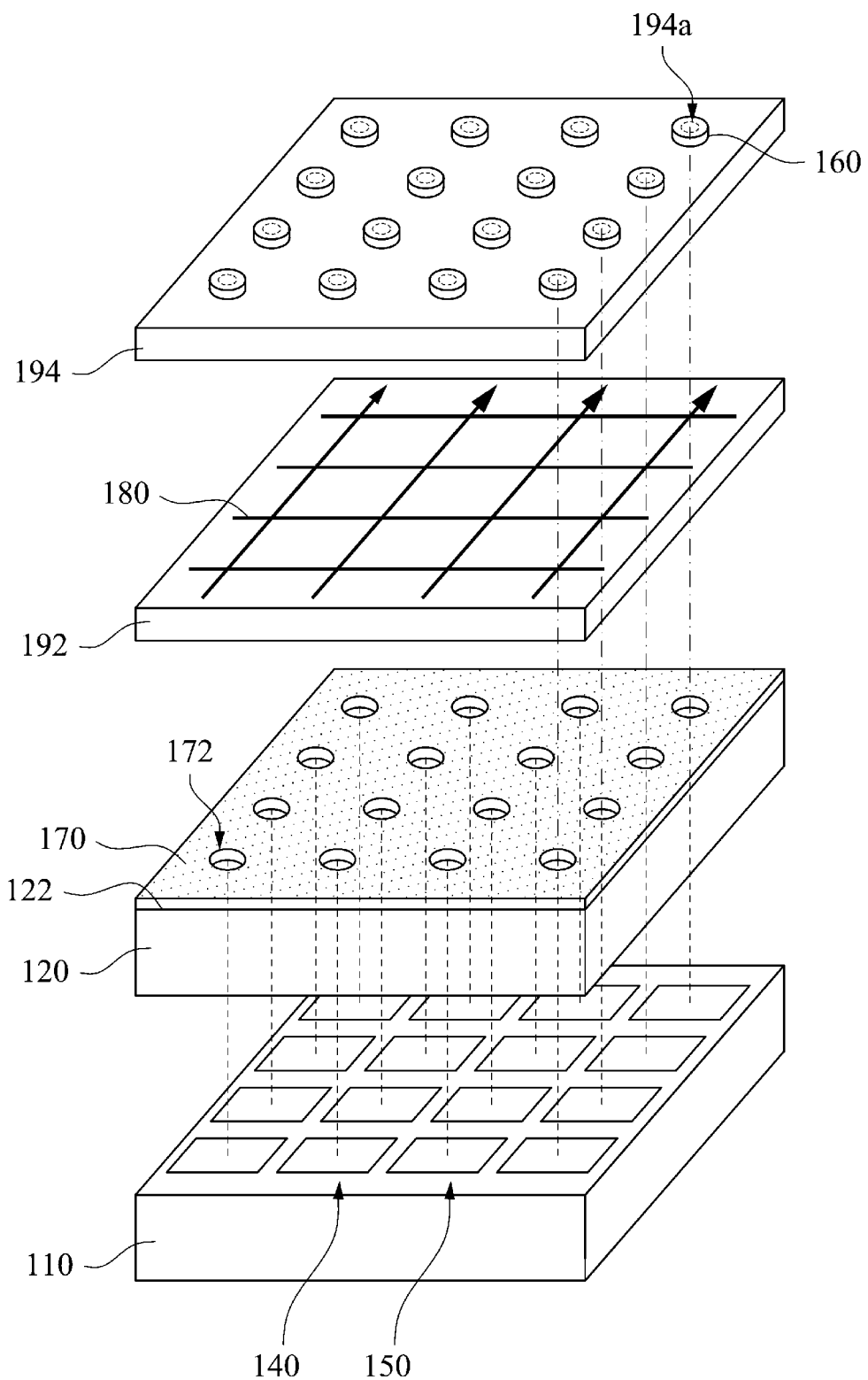
FIG. 5A is an exploded view of a dual-mode capacitive touch display panel according to yet another embodiment of the present disclosure.
Figure 5B:
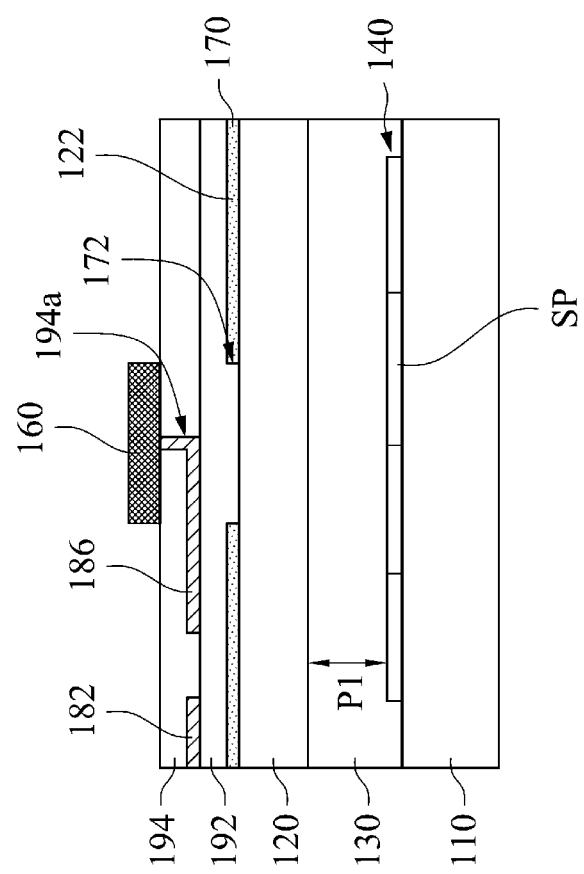
FIG. 5B is a partial cross-sectional view of the dual-mode capacitive touch display panel in FIG. 5A.

FIG. 5A is an exploded view of a dual-mode capacitive touch display panel 100 according to yet another embodiment of the present disclosure. FIG. 5B is a partial cross-sectional view of the dual-mode capacitive touch display panel 100 in FIG. 5A. The present embodiment is similar to the embodiment in FIG. 1A, wherein the difference is that in the present embodiment, the dual-mode capacitive touch display panel 100 comprises a first insulating layer 192 and a second insulating layer 194. At least one of materials of the first insulating layer 192 and the second insulating layer 194 may be selected from the materials of the insulating layer 190 described above; the materials of the first insulating layer 192 and the second insulating layer 194 may be substantially the same or different from each other. In addition, a touch electrode may also be used, such as the touch electrodes shown in FIG. 1 or FIG. 3.

The first insulating layer 192 is sandwiched between the control circuit 180 and the shielding conductive layer 170, wherein the first insulating layer 192 extends to cover the openings 172. The second insulating layer 194 is disposed on the outer surface 122 of the second substrate 120, wherein the second insulating layer 194 covers the control circuit 180 and the first insulating layer 192; the second insulating layer 194 has a plurality of openings 194a, and one of the pressure sensing electrodes 160 is at least located on one of the openings 194a of the second insulating layer 194. Each of the pressure sensing electrodes 160 is connected to the control circuit 180 located on the outer surface of the second substrate 120 via a corresponding opening 194a. The design shown in FIG. 1B is taken as an example of the control circuit 180 of the present embodiment, but the present disclosure is not limited thereto. In another embodiment, the control circuit 180 may be only latticed wires (or namely mesh wire) consisting of a plurality of wires; such as wires in different directions (for example, an X direction and a Y direction) are connected to each other, and the switch element 188 is not present. In an example of an embodiment of the present disclosure, the opening 172 at least partially overlaps with the opening 194a in the direction vertically projected onto the second substrate 120, but the present disclosure is not limited thereto. In another embodiment, the opening 172 does not overlap with the opening 194a in the direction vertically projected onto the second substrate 120.

In the present embodiment, in design, each of the openings 172 of the shielding conductive layer 170 at least partially overlaps with a corresponding touch electrode 140 or each of the openings 172 of the shielding conductive layer 170 at least partially overlaps with a corresponding second touch electrode 150 in the vertical projection direction (vertically projected onto the first substrate 110). Thus, a vertical electrical field passing through each of the openings 172 may be generated between a pressure sensing electrode 160 and a corresponding first touch electrode 140 or between a pressure sensing electrode 160 and a corresponding second touch electrode 150. A change of the spacing P1 is calculated by detecting a capacitance change amount and/or an electrical field change between each of the first touch electrodes 140 and a corresponding pressure sensing electrode 160 or between each of the second touch electrodes 150 and a corresponding pressure sensing electrode 160, thus obtaining an external force applied by a user.

In the present embodiment, the vertical projection area (an area vertically projected onto the second substrate 120) of the pressure sensing electrode 160 is roughly equal to the vertical projection area (an area vertically projected onto the second substrate 120) of the opening 172 of the shielding conductive layer 170, but the scope of the present disclosure should not be limited thereto. In some embodiments, although not depicted herein, because the pressure sensing electrode 160 is not disposed in the opening 172 of the shielding conductive layer 170, the vertical projection area (the area vertically projected onto the second substrate 120) of the pressure sensing electrode 160 may be greater than the vertical projection area (the area vertically projected onto the second substrate 120) of the opening 172 of the shielding conductive layer 170. Alternatively, in some embodiments, the vertical projection area (the area vertically projected onto the second substrate 120) of the pressure sensing electrode 160 may be less than the vertical projection area (the area vertically projected onto the second substrate 120) of the opening 172 of the shielding conductive layer 170; yet the pressure sensing electrode 160 still at least partially overlaps with a corresponding first touch electrodes 140 or the pressure sensing electrode 160 still at least partially overlaps with a corresponding second touch electrode 150 in the vertical projection direction (vertically projected onto the first substrate 110).

Other details of the present embodiment are generally as described above and are not repeatedly described herein.

Figure 6A:
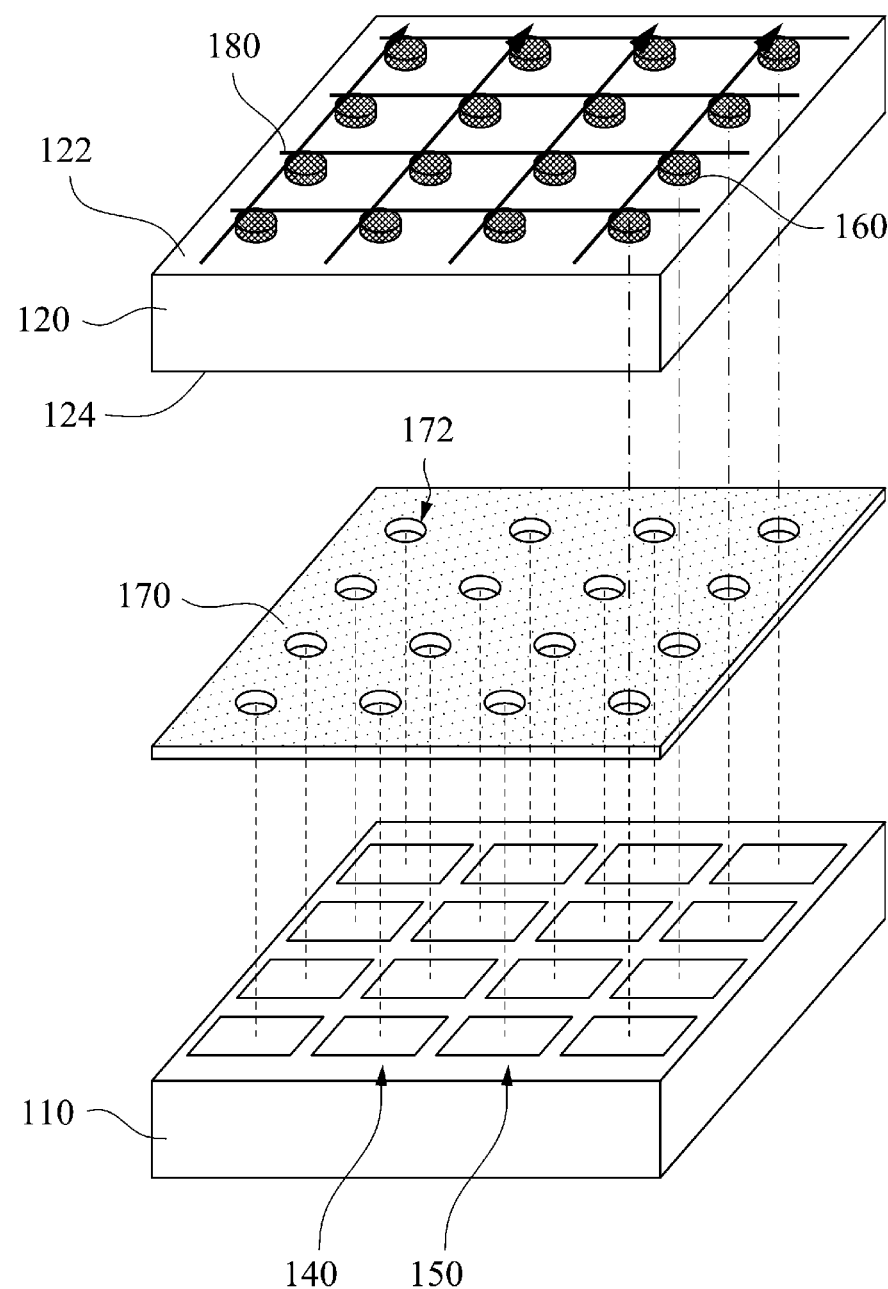
FIG. 6A is an exploded view of a dual-mode capacitive touch display panel according to another further embodiment of the present disclosure.
Figure 6B:
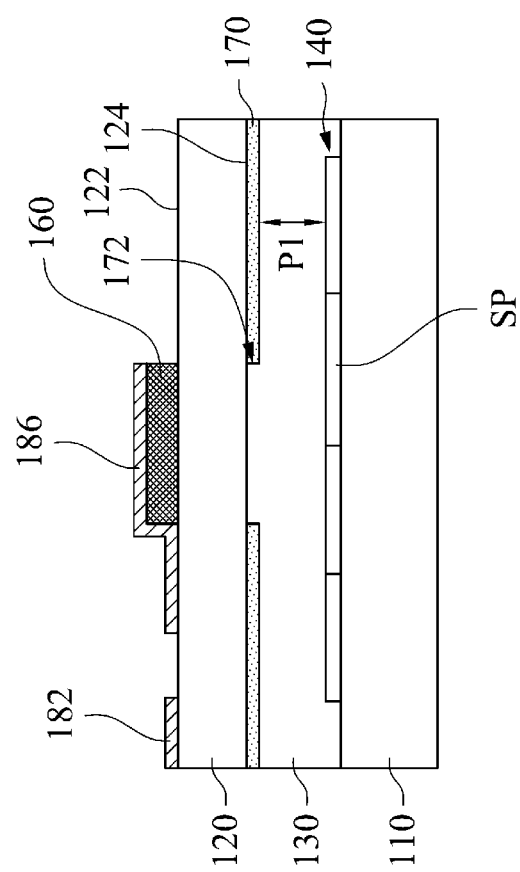
FIG. 6B is a partial cross-sectional view of the dual-mode capacitive touch display panel in FIG. 6A.

FIG. 6A is an exploded view of a dual-mode capacitive touch display panel 100 according to yet another embodiment of the present disclosure. FIG. 6B is a partial cross-sectional view of the dual-mode capacitive touch display panel 100 in FIG. 6A. The present embodiment is similar to the embodiment in FIG. 1A, wherein the difference is that in the present embodiment, the shielding conductive layer 170 is disposed on the inner surface 124 of the second substrate 120; the pressure sensing electrode 160 is disposed on the outer surface 122 of the second substrate 120, and located on the shielding conductive layer 170; the inner surface 124 of the second substrate 120 faces the inner surface of the first substrate 110 (not marked). In addition, the touch electrode may also be used, such as the touch electrodes shown in FIG. 1 or FIG. 3.

In the present embodiment, the control circuit 180 is disposed on the outer surface 122 of the second substrate 120 and is electrically connected to the pressure sensing electrodes 160. The design shown in FIG. 1B is taken as an example of the control circuit 180 of the present embodiment, but the present disclosure is not limited thereto. In another embodiment, the control circuit 180 may be only latticed wires (or namely mesh wire) consisting of a plurality of wires; such as wires in different directions (for example, an X direction and a Y direction) are connected to each other. The switch element 188 is not present; such as the control circuit 180 can be directly connected to the pressure sensing electrode 160.

In the present embodiment, each of the openings 172 of the shielding conductive layer 170 at least partially overlaps with a corresponding touch electrode 140 or each of the openings 172 of the shielding conductive layer 170 at least partially overlaps with a corresponding second touch electrode 150 in the vertical projection direction (vertically projected onto the first substrate 110). Thus, a vertical electrical field passing through each of the openings 172 may be generated between a pressure sensing electrode 160 and a corresponding first touch electrode 140 or between a pressure sensing electrode 160 and a corresponding second touch electrode 150. A change of the spacing P1 is calculated by detecting a capacitance change amount and/or an electrical field change between each of the first touch electrodes 140 and a corresponding pressure sensing electrode 160 or between each of the second touch electrodes 150 and a corresponding pressure sensing electrode 160, thus obtaining an external force applied by a user.

In the present embodiment, preferably, the vertical projection area of the pressure sensing electrode 160 is roughly equal to the vertical projection area of the opening 172 of the shielding conductive layer 170; such as one of the pressure sensing electrodes 160 at least partially overlaps with one of the openings 172 of the shielding conductive layer 170 in the direction vertically projected onto the second substrate 120. A capacitance change amount between the pressure sensing electrode 160 and a corresponding first touch electrodes 140 or between the pressure sensing electrode 160 and a corresponding second touch electrode 150 will therefore not be shielded by the shielding conductive layer 170, but the scope of the present disclosure should not be limited thereto. In some embodiments, although not depicted herein, because the pressure sensing electrode 160 is not disposed in the opening 172 of the shielding conductive layer 170, the vertical projection area of one of the pressure sensing electrodes 160 may be greater than the vertical projection area of one of the opening 172s of the shielding conductive layer 170; such as one of the pressure sensing electrodes 160 at least partially overlaps with one of the openings 172 of the shielding conductive layer 170 in the direction vertically projected onto the second substrate 120. Alternatively, in some embodiments, the vertical projection area of one of the pressure sensing electrodes 160 may be less than the vertical projection area of one of the openings 172 of the shielding conductive layer 170; such as one of the pressure sensing electrodes 160 at least partially overlaps with one of the openings 172 of the shielding conductive layer 170 in the direction vertically projected onto the second substrate 120; yet the pressure sensing electrode 160 still at least partially overlaps with a corresponding first touch electrodes 140 or the pressure sensing electrode 160 still at least partially overlaps with a corresponding second touch electrode 150 in the vertical projection direction (vertically projected onto the first substrate 110).

Other details of the present embodiment are generally as described above and are not repeatedly described herein.

Figure 7:
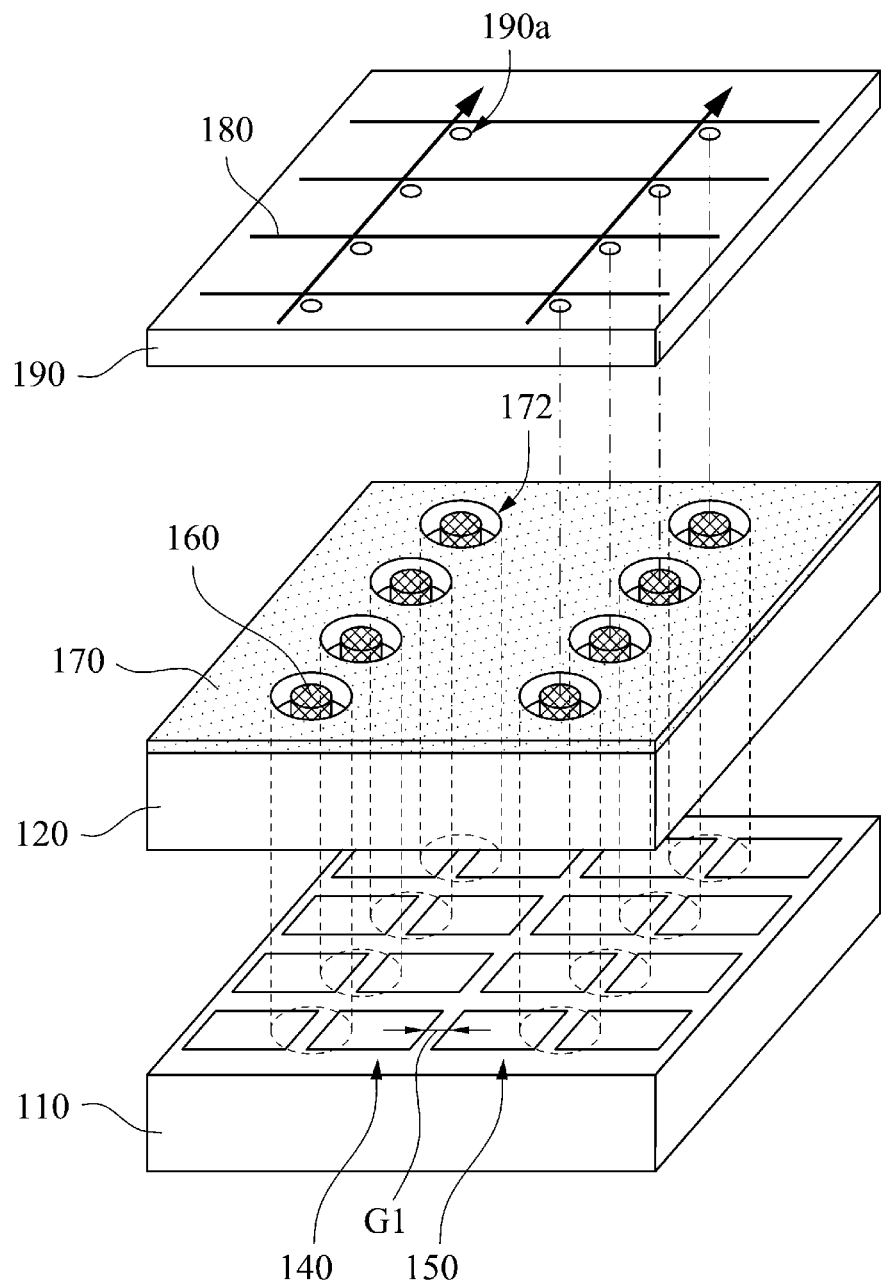
FIG. 7 is an exploded view of a dual-mode capacitive touch display panel according to another embodiment of the present disclosure.

FIG. 7 is an exploded view of a dual-mode capacitive touch display panel 100 according to another embodiment of the present disclosure. The present embodiment is similar to the embodiment in FIG. 1A, wherein the difference is that in the present embodiment, a gap G1 exists between one of the first touch electrodes 140 and one of the second touch electrodes 150, wherein each of the first touch electrodes 140 and a corresponding gap G1 at least partially overlap with a corresponding pressure sensing electrode 160 in the vertical projection direction (vertically projected onto the first substrate 110). In addition, the touch electrode shown in FIG. 1 is taken as an example for the touch electrode. In another embodiment, the touch electrode may also be used, such as the touch electrode shown in FIG. 3. The design shown in FIG. 1B is taken as an example of the control circuit 180 of the present embodiment, but the present disclosure is not limited thereto. In another embodiment, the control circuit 180 may be only latticed wires (or namely mech wire) consisting of a plurality of wires; that is, wires in different directions (for example, an X direction and a Y direction) are connected to each other. The switch element 188 is not present; that is, the control circuit 180 can be directly connected to the pressure sensing electrode 160.

In the present embodiment, one of the pressure sensing electrodes 160 at least partially overlaps with the first touch electrode 140 and the gap G1 in the vertical projection direction (vertically projected onto the first substrate 110) and/or another of the pressure sensing electrodes 160 at least partially overlaps with the second touch electrode 150 and the gap G1 in the vertical projection direction (vertically projected onto the first substrate 110). In the present embodiment, one of the pressure sensing electrodes 160 at least partially overlaps with the first touch electrode 140, the second touch electrode 150, and the gap G1 between the first touch electrode 140 and the second touch electrode 150 in the vertical projection direction (vertically projected onto the first substrate 110), but the present disclosure is not limited thereto. In this way, a vertical electrical field may be generated between the pressure sensing electrode 160 and the corresponding first touch electrode 140 or between the pressure sensing electrode 160 and the corresponding second touch electrode 150. An external force applied by a user is calculated and obtained by detecting a capacitance change amount and/or an electrical field change between each of the first touch electrodes 140 and a corresponding pressure sensing electrode 160 or between each of the second touch electrodes 150 and a corresponding pressure sensing electrode 160.

In the present embodiment, the overlapping area (an overlapping area vertically projected onto the first substrate 110) of the pressure sensing electrode 160 and the first touch electrode 140 is substantially the same as the overlapping area of the pressure sensing electrode 160 and the second touch electrode 150; the first touch electrode 140 and the second touch electrode 150 will therefore be able to experience the applied force evenly. Certainly, the scope of the present disclosure should not be limited thereto. In another embodiment, the overlapping area (the overlapping area vertically projected onto the first substrate 110) of the pressure sensing electrode 160 and the first touch electrode 140 may be different from the overlapping area of the pressure sensing electrode 160 and the second touch electrode 150; yet the pressure sensing electrode 160 still at least partially overlaps with a corresponding first touch electrode 140 or a corresponding second touch electrode 150 in the vertical projection direction (vertically projected onto the first substrate 110).

Other details of the present embodiment are, in general, as described above and are not repeatedly described herein.

Figure 8:
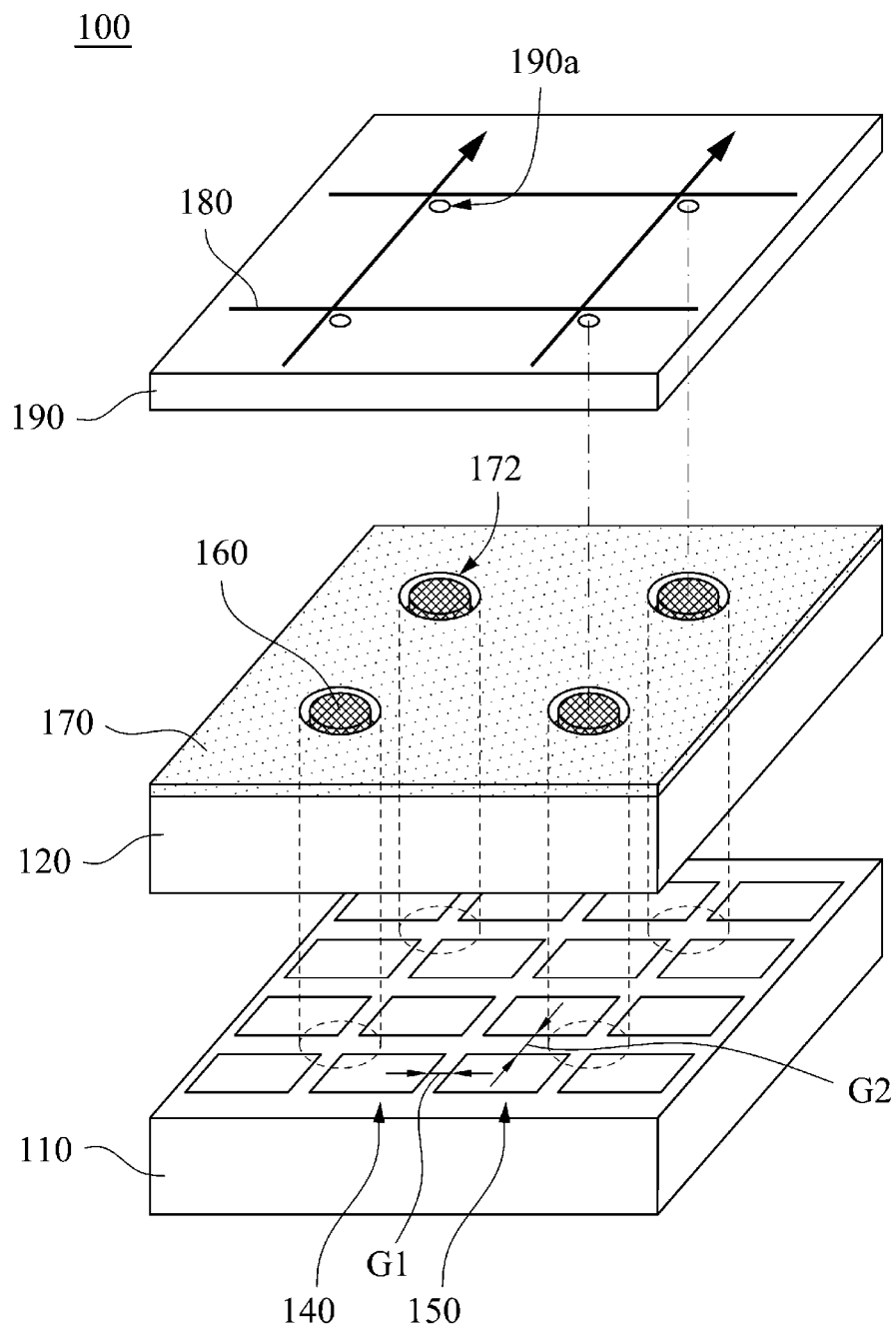
FIG. 8 is an exploded view of a dual-mode capacitive touch display panel according to yet another embodiment of the present disclosure.

FIG. 8 is an exploded view of a dual-mode capacitive touch display panel 100 according to another further embodiment of the present disclosure. The present embodiment is similar to the embodiment in FIG. 1A, wherein the difference is that in the present embodiment, a another gap (or namely second gap) G2 exists between two first touch electrodes 140 and between two second touch electrodes 150; and gap (or namely first gap) G1 exists between one of the first touch electrodes 140 and one of the second touch electrodes 150. The first touch electrode 140, the second touch electrode 150, the another gap G2, and gap G1 all at least partially overlap with one of the pressure sensing electrodes 160 in the vertical projection direction (vertically projected onto the first substrate 110). In addition, the touch electrode shown in FIG. 1 is taken as an example of the touch electrode. In another embodiment, the touch electrode may also be used, such as the touch electrode shown in FIG. 3. The design shown in FIG. 1B is taken as an example of the control circuit 180 of the present embodiment, but the present disclosure is not limited thereto. In another embodiment, the control circuit 180 may be only latticed wires (or namely mesh wire) consisting of a plurality of wires; that is, wires in different directions (for example, an X direction and a Y direction) are connected to each other. The switch element 188 is not present; that is, the control circuit 180 can be directly connected to the pressure sensing electrode 160.

In this way, a vertical electrical field may be generated between the pressure sensing electrode 160 and the corresponding first touch electrode 140 or between the pressure sensing electrode 160 and a corresponding second touch electrode 150. An external force applied by a user is calculated and obtained by detecting a capacitance change amount and/or an electrical field change between each of the first touch electrodes 140 and a corresponding pressure sensing electrode 160 or between each of the second touch electrodes 150 and a corresponding pressure sensing electrode 160.

In the present embodiment, the overlapping area (an overlapping area vertically projected onto the first substrate 110) of the pressure sensing electrode 160 and the first touch electrode 140 is substantially the same as the overlapping area of the pressure sensing electrode 160 and the second touch electrode 150; the first touch electrode 140 and the second touch electrode 150 will therefore be able to experience the applied force evenly. Certainly, the scope of the present disclosure should not be limited thereto. In another embodiment, the overlapping area (the overlapping area vertically projected onto the first substrate 110) of the pressure sensing electrode 160 and the first touch electrode 140 may be different from the overlapping area of the pressure sensing electrode 160 and the second touch electrode 150; yet the pressure sensing electrode 160 still at least partially overlaps with a corresponding first touch electrode 140 or a corresponding second touch electrode 150 in the vertical projection direction (vertically projected onto the first substrate 110).

Other details of the present embodiment are, in general, as described above and are not repeatedly described herein.

A dual-mode capacitive touch display panel is provided in many embodiments of the present disclosure, wherein other than having a display mode, the dual-mode capacitive touch display panel may operate in an outer-force-detection mode and a touch-position-detection mode. In the dual-mode capacitive touch display panel, an induction electrode is configured to detect a touch position, and the induction electrode is integrated with a pressure sensing electrode to detect strength. In addition, the shielding conductive layer may shield an electrical field in the outer-force-detection mode and allow the electrical field to pass through it in the touch-position-detection mode, thereby achieving a dual-mode capacitive touch effect.

Even though the present disclosure has been disclosed as the various above-mentioned embodiments, it is not limited thereto. Any person of ordinary skill in the art may make various changes and adjustments without departing from the spirit and scope of the present disclosure. Therefore, the scope of the present disclosure is defined in view of the appended claims.

What is claimed is:

1. A dual-mode capacitive touch display panel, comprising:
   a plurality of touch electrodes on a first substrate;
   a plurality of pressure sensing electrodes on a second substrate;
   a control circuit, controlling electric potential on said plurality of pressure sensing electrodes;
   a shielding conductive layer, including a plurality of first openings, wherein each of said plurality of first openings corresponds and aligns to one of said plurality of pressure sensing electrodes;
   wherein both said plurality of pressure sensing electrodes and said shielding conductive layer are floating under a touch mode operation, and both said plurality of pressure sensing electrodes and said shielding conductive layer have a first potential under a force sensing mode operation.

2. The dual-mode capacitive touch display panel according to claim 1, further comprising:
   an insulating layer for separating said control circuit and said shielding conductive layer.

3. The dual-mode capacitive touch display panel according to claim 2, wherein said insulating layer includes a plurality of second openings, and each of said plurality of second openings corresponds and aligns to one of said plurality of first openings.

4. The dual-mode capacitive touch display panel according to claim 3, wherein said each of said plurality of pressure sensing electrodes positions within one of said plurality of first openings, and said control circuit connects to said plurality of force sensing electrodes via said plurality of second openings.

5. The dual-mode capacitive touch display panel according to claim 2, wherein both said control circuit and said plurality of force sensing electrodes are positioned on said first separating layer.

6. The dual-mode capacitive touch display panel according to claim 2, wherein said each of said plurality of pressure sensing electrodes positions within one of said plurality of first openings.

7. The dual-mode capacitive touch display panel according to claim 2, where said insulating layer is selected from one of a first insulating layer and a substrate.

8. The dual-mode capacitive touch display panel according to claim 7, further comprising:
   a second insulation layer;
   wherein said control circuit is positioned on said first separating layer, said plurality of force sensing electrodes are positioned on said second insulation layer, and said control circuit is sandwiched between said shielding conductive layer and said plurality of force sensing electrodes.

9. The dual-mode capacitive touch display panel according to claim 1, wherein each of said plurality of force sensing electrodes aligns to one of the said plurality of touch electrodes.

10. The dual-mode capacitive touch display panel according to claim 1, wherein each of said plurality of force sensing electrodes aligns to a center space between two adjacent touch electrodes.

11. The dual-mode capacitive touch display panel according to claim 1, wherein each of said plurality of force sensing electrodes aligns to a center space among four adjacent touch electrodes.

* * * * *